United States Patent
Cao et al.

(10) Patent No.: US 12,321,026 B2
(45) Date of Patent: Jun. 3, 2025

(54) COMPOSITE MODULE AND MANUFACTURING METHOD THEREOF

(71) Applicant: Huawei Technologies Co., Ltd., Shenzhen (CN)

(72) Inventors: Lu Cao, Shenzhen (CN); Shimin Gao, Dongguan (CN)

(73) Assignee: HUAWEI TECHNOLOGIES CO., LTD., Shenzhen (CN)

(*) Notice: Subject to any disclaimer, the term of this patent is extended or adjusted under 35 U.S.C. 154(b) by 179 days.

(21) Appl. No.: 18/111,357

(22) Filed: Feb. 17, 2023

(65) Prior Publication Data

US 2023/0204884 A1 Jun. 29, 2023

Related U.S. Application Data

(63) Continuation of application No. PCT/CN2021/112869, filed on Aug. 16, 2021.

(30) Foreign Application Priority Data

Aug. 18, 2020 (CN) .......................... 202010831724.6
Sep. 22, 2020 (CN) .......................... 202011004279.2

(51) Int. Cl.
*H04B 10/00* (2013.01)
*G02B 6/38* (2006.01)
(Continued)

(52) U.S. Cl.
CPC ......... *G02B 6/4293* (2013.01); *G02B 6/3817* (2013.01); *G02B 6/4246* (2013.01);
(Continued)

(58) Field of Classification Search
CPC .. G02B 6/4293; G02B 6/3817; G02B 6/4246; G02B 6/4278; G02B 6/428;
(Continued)

(56) References Cited

U.S. PATENT DOCUMENTS 4,986,625 A * 1/1991 Yamada ............... G02B 6/4292
385/55
6,860,649 B2 * 3/2005 Edwards .............. G02B 6/4292
385/92
(Continued)

FOREIGN PATENT DOCUMENTS

CN 103576256 A 2/2014
CN 103617833 A 3/2014
(Continued)

OTHER PUBLICATIONS

IEEE Std 802.3™-2018, IEEE Standard for Ethernet, Jun. 14, 2018, total 5600 pages. Filed in 3 parts due to size of file.

*Primary Examiner* — Agustin Bello
(74) *Attorney, Agent, or Firm* — SLATER MATSIL, LLP

(57) ABSTRACT

A composite module includes a housing, an optical component, and a power supply component. A first end of the housing is provided with a first socket, and a second end of the housing is provided with a second socket. The optical component includes a first optical connector, an optical-to-electrical conversion component, and a second optical connector. One end of the optical-to-electrical conversion component is connected to the first optical connector, and the other end of the optical-to-electrical conversion component is connected to the second optical connector. The power supply component includes a first electrical connector, a power supply line, and a second electrical connector. One end of the power supply line is connected to the first electrical connector, and the other end of the power supply line is connected to the second electrical connector.

21 Claims, 12 Drawing Sheets

(51) Int. Cl.

| | | |
|---|---|---|
| *G02B 6/42* | (2006.01) | |
| *H01R 13/04* | (2006.01) | |
| *H01R 13/05* | (2006.01) | |
| *H01R 13/08* | (2006.01) | |
| *H01R 13/10* | (2006.01) | |
| *H01R 13/22* | (2006.01) | |
| *H01R 13/24* | (2006.01) | |
| *H01R 13/26* | (2006.01) | |
| *H01R 13/518* | (2006.01) | |
| *H01R 31/06* | (2006.01) | |
| *H01R 43/20* | (2006.01) | |
| *H04B 10/80* | (2013.01) | |

(52) U.S. Cl.
CPC ........... *G02B 6/4278* (2013.01); *G02B 6/428* (2013.01); *G02B 6/4284* (2013.01); *G02B 6/4292* (2013.01); *H01R 13/04* (2013.01); *H01R 13/05* (2013.01); *H01R 13/08* (2013.01); *H01R 13/10* (2013.01); *H01R 13/22* (2013.01); *H01R 13/2471* (2013.01); *H01R 13/26* (2013.01); *H01R 13/518* (2013.01); *H01R 31/06* (2013.01); *H01R 43/20* (2013.01); *H04B 10/801* (2013.01); *H04B 10/808* (2013.01)

(58) Field of Classification Search
CPC .. G02B 6/4284; G02B 6/4292; G02B 6/4274; H04B 10/801; H04B 10/808
See application file for complete search history.

(56) References Cited

U.S. PATENT DOCUMENTS

| | | | | |
|---|---|---|---|---|
| 7,160,032 B2* | 1/2007 | Nagashima | .......... | G02B 6/4201 385/101 |
| 7,331,819 B2* | 2/2008 | Nelson | ................ | G02B 6/4274 439/577 |
| 7,445,389 B2* | 11/2008 | Aronson | ............. | G02B 6/4292 385/88 |
| 7,841,904 B2* | 11/2010 | Lin | ........................ | H01R 13/58 439/660 |
| 8,021,057 B2* | 9/2011 | Tamura | ................ | G02B 6/4269 385/75 |
| 8,646,991 B2* | 2/2014 | Sakurai | ................ | G02B 6/3817 398/141 |
| 8,985,873 B2* | 3/2015 | Sakurai | ................ | G02B 6/4293 385/92 |
| 9,097,090 B2* | 8/2015 | Davey | ................... | E21B 47/135 |
| 9,523,827 B2* | 12/2016 | Sano | ................... | G02B 6/4293 |
| 9,544,058 B2* | 1/2017 | Coffey | ................. | G02B 6/3895 |
| 10,469,175 B2* | 11/2019 | Jachetta | ............... | G02B 6/4261 |
| 10,535,954 B2* | 1/2020 | Kia | ....................... | H01R 13/641 |
| 10,855,041 B2* | 12/2020 | Chou | ................... | G02B 6/4292 |
| 11,212,013 B2* | 12/2021 | Goergen | ................ | H04L 12/10 |
| 11,619,789 B2* | 4/2023 | Chen | .................... | G02B 6/4292 385/88 |
| 11,956,090 B2* | 4/2024 | Cao | ....................... | G02B 6/4274 |
| 2002/0015565 A1 | 2/2002 | Imamura | | |
| 2002/0160656 A1* | 10/2002 | Nishita | ................ | G02B 6/4246 439/577 |
| 2006/0263012 A1* | 11/2006 | Yamazaki | ............ | H04B 10/801 385/88 |
| 2007/0010132 A1* | 1/2007 | Nelson | ................ | G02B 6/4284 439/577 |
| 2007/0237463 A1* | 10/2007 | Aronson | ............. | G02B 6/4292 385/89 |
| 2010/0098382 A1* | 4/2010 | Tamura | ................ | G02B 6/4257 385/78 |
| 2010/0158448 A1* | 6/2010 | Yi | ....................... | H01R 13/6471 385/74 |
| 2010/0303465 A1* | 12/2010 | Dahlfort | .............. | G02B 6/4201 398/115 |
| 2011/0243511 A1* | 10/2011 | Tong | .................... | G02B 6/3817 385/88 |
| 2013/0195470 A1* | 8/2013 | Yasuda | ................ | G02B 6/4214 29/592.1 |
| 2016/0299295 A1* | 10/2016 | ten Have | ............ | G02B 6/3882 |
| 2016/0299300 A1* | 10/2016 | Lavoie | ................. | G02B 6/4261 |
| 2017/0269316 A1* | 9/2017 | Chang | .................... | H01L 24/81 |
| 2018/0031775 A1* | 2/2018 | Gurreri | ............... | G02B 6/3821 |
| 2018/0149819 A1* | 5/2018 | Rivaud | ................ | G02B 6/3814 |
| 2018/0375591 A1* | 12/2018 | Sipes, Jr. | ................ | H04L 12/10 |
| 2019/0004261 A1* | 1/2019 | Koch | ................... | G02B 6/3893 |
| 2019/0219780 A1* | 7/2019 | Andrus | ................ | G02B 6/4471 |
| 2019/0363493 A1 | 11/2019 | Sironi et al. | | |
| 2020/0044751 A1* | 2/2020 | Goergen | ................ | H04L 12/12 |
| 2020/0106227 A1* | 4/2020 | Chou | ................. | H01R 13/6675 |
| 2020/0153515 A1* | 5/2020 | Goergen | ............... | G01J 1/4257 |
| 2020/0195350 A1* | 6/2020 | Matsui | ................ | G02B 6/4281 |
| 2020/0355881 A1* | 11/2020 | Minekawa | ........... | G02B 6/4286 |
| 2021/0149134 A1* | 5/2021 | Lai | ........................ | G02B 6/4292 |
| 2022/0021457 A1* | 1/2022 | Lu | ........................... | H04B 10/40 |
| 2022/0075126 A1* | 3/2022 | Chang | ................... | G02B 6/3825 |
| 2023/0194812 A1* | 6/2023 | Gao | ....................... | H01R 13/10 385/88 |
| 2023/0204884 A1* | 6/2023 | Cao | ....................... | H01R 31/06 385/92 |

FOREIGN PATENT DOCUMENTS

| | | |
|---|---|---|
| CN | 102405430 B | 9/2014 |
| CN | 209045195 U | 6/2019 |
| CN | 111129876 A | 5/2020 |
| CN | 111413770 A | 7/2020 |
| EP | 1471371 A2 | 10/2004 |
| WO | 2019051196 A1 | 3/2019 |

* cited by examiner

COMPOSITE MODULE AND MANUFACTURING METHOD THEREOF

CROSS-REFERENCE TO RELATED APPLICATIONS

This application is a continuation of International Application No. PCT/CN2021/112869, filed on Aug. 16, 2021, which claims priority to Chinese Patent Application No. 202010831724.6, filed on Aug. 18, 2020 and Chinese Patent Application No. 202011004279.2, filed on Sep. 22, 2020, all of which are herein incorporated by reference in their entireties.

TECHNICAL FIELD

This application relates to the field of optical communication technologies, and in particular, to a composite module and a manufacturing method thereof.

BACKGROUND

Power over Ethernet power supply, also referred to as PoE (power over Ethernet) power supply, is a technology that can supply power to some devices such as an IP (Internet Protocol) telephone set, an AP (access point) device, and a network camera while transmitting a data signal.

For example, a switch can be connected to the ap through a composite cable in which an optical fiber and a copper wire are wrapped. For example, an optical module is inserted into a panel of the switch, and may be denoted as a first optical module. An optical module is inserted into a panel of the ap, and may be denoted as a second optical module. Then, the first optical module is connected to the second optical module through the composite cable, to connect the switch and the ap.

To implement the foregoing connection, correspondingly, each end of the composite cable is provided with an optical fiber connector and a power connector, the panels of the switch and the ap each are provided with an optical port and an electrical port, the optical port is provided with an optical interface configured to connect to the optical fiber connector, and the electrical port is provided with an electrical interface configured to connect to the power connector.

In this way, the first optical module is inserted into the optical port of the switch, the second optical module is inserted into the optical port of the ap, the optical fiber connector at one end of the composite cable is inserted into the first optical module, the power connector is inserted into the electrical port of the switch, the optical fiber connector at the other end of the composite cable is inserted into the second optical module, and the power connector is inserted into the electrical port of the ap, so that the switch is connected to the ap through the composite cable and the two optical modules.

The foregoing solution does not facilitate miniaturization development of the switch and the ap.

SUMMARY

This application provides a composite module and a manufacturing method thereof, to overcome a problem in the related art. The technical solutions are as follows.

According to one aspect, a composite module is provided, including a housing, an optical component, and a power supply component, where a first end of the housing is provided with a first socket, and a second end of the housing is provided with a second socket; the optical component includes a first optical connector, an optical-to-electrical conversion component, and a second optical connector, where one end of the optical-to-electrical conversion component is connected to the first optical connector, and the other end of the optical-to-electrical conversion component is connected to the second optical connector; the power supply component includes a first electrical connector, a power supply line, and a second electrical connector, where one end of the power supply line is connected to the first electrical connector, and the other end of the power supply line is connected to the second electrical connector; and both the optical-to-electrical conversion component and the power supply line are located in the housing, the first optical connector is located in the first socket, the first electrical connector is exposed from the housing, and both the second optical connector and the second electrical connector are located in the second socket.

In some examples, the housing, as a protection housing of the composite module, is configured to protect components inside the composite module, to implement protection, dust-proof, and water-proof functions. A first end of the housing in a length direction is provided with a first socket, and a second end of the housing is provided with a second socket. The first socket may be used as a socket for a composite cable to be inserted, and the second socket may be used as a socket for the composite module to be inserted into a device.

In some examples, the optical component is a component configured to implement conversion between an optical signal and an electrical signal, and may include a first optical connector, and optical-to-electrical conversion component, and a second optical connector. One of the first optical connector and the second optical connector is configured to connect to the composite cable, and the other of the first optical connector and the second optical connector is configured to connect to the inserted device. For example, the first optical connector may be configured to connect to the composite cable, and the second optical connector may be configured to connect to the inserted device. As described above, the first socket may be used as the socket for the composite cable to be inserted, and the second socket may be used as the socket for the composite module to be inserted into the device. Correspondingly, the first optical connector may be located in the first socket, and the second optical connector may be located in the second socket.

In some examples, the power supply component is a component configured to implement poe power supply, and may include a power supply line and a first electrical connector and a second electrical connector that are located at two ends of the power supply line. One of the first electrical connector and the second electrical connector is configured to connect to the composite cable, and the other of the first electrical connector and the second electrical connector is configured to connect to the device into which the composite module is inserted. For example, the first electrical connector is configured to connect to the composite cable, and the second electrical connector is configured to connect to the inserted device. As described above, the second socket may be used as the socket for the composite module to be inserted into the device. Correspondingly, the second electrical connector is located in the second socket.

Based on the foregoing description, both the optical-to-electrical conversion component of the optical component and the power supply line of the power supply component are located in the housing, the housing is provided with the first socket for the composite cable to be inserted and the second socket to be inserted into the device, both the optical component and the power supply component are located in the housing, the first optical connector connected to one end of the optical-to-electrical conversion component is located in the first socket, and the first electrical connector connected to one end of the power supply line is exposed from the housing, and both the second optical connector connected to the other end of the optical-to-electrical conversion component and the second electrical connector connected to the other end of the power supply line are located in the second socket. In this way, the power supply component for implementing a poe power supply function and the optical component for implementing an optical-to-electrical conversion function are integrated together to obtain the composite module. Therefore, only interfaces for inserting the composite module need to be provided on panels of an inserted device, for example, a switch and an ap, and no interface for inserting a power connector needs to be provided, thereby reducing sizes of the panels of the switch and the ap, and facilitating miniaturization development of the switch and the ap.

In a possible implementation, the first electrical connector is located in the first socket.

In an example, the first electrical connector is exposed from the housing. For example, the first electrical connector may be located at an end face of the first end of the housing and close to the first socket. For another example, the first electrical connector may be located in the first socket with the first optical connector, and the first electrical connector is exposed from the housing by being located in the first socket.

In a possible implementation, the composite module may be a single-fiber bidirectional composite module. Correspondingly, there is one first optical connector. In this case, the first electrical connector may be located around the first optical connector.

In some examples, the first electrical connector and the first optical connector may be located in the first socket side by side in the left-right direction, or the first electrical connector and the first optical connector may be located in the first socket side by side in the up-down direction. This is not limited in this embodiment. A skilled person can flexibly select a relative position relationship between the first electrical connector and the first optical connector based on an actual situation.

In a possible implementation, there are two first optical connectors, and the first electrical connector is located between the two first optical connectors.

In some examples, the composite module may be a two-fiber bidirectional module, there are two first optical connectors, and the first electrical connector is located between the two first optical connectors. In another example, the composite module may be a single-fiber bidirectional module, and the first electrical connector may be located at any position around the first optical connector. The relative position relationship between the first optical connector and the first electrical connector is not specifically limited in this embodiment, provided that both the first optical connector and the first electrical connector can be located in the first socket. A skilled person can flexibly select the relative position relationship between the first optical connector and the first electrical connector based on the actual situation.

In a possible implementation, the first electrical connector includes a first electrical connector mounting portion, a first electrical connector connecting portion, and a first electrical connector conductive portion; one end of the first electrical connector mounting portion is fixed to the first electrical connector connecting portion, and the other end of the first electrical connector mounting portion is fixed to the housing; and the first electrical connector conductive portion is of a strip structure, one end of the first electrical connector conductive portion is electrically connected to the power supply line, the other end of the first electrical connector conductive portion extends out of the first electrical connector mounting portion, and the first electrical connector conductive portion is fixed to the first electrical connector connecting portion.

In some examples, the first electrical connector mounting portion is configured to be fixed to the housing, and may be made of a plastic part or the like. The first electrical connector connecting portion is configured to plug-connect to the composite cable, for example, be plug-connected to a power connector of the composite cable, and may also be made of a plastic part or the like. The first electrical connector conductive portion is configured to electrically connect to a copper wire in the composite cable, and may be made of metal or the like.

In some examples, an end portion of the first electrical connector mounting portion away from the first electrical connector connecting portion is fixedly connected to the housing. For example, the housing is provided with a beam for blocking the first socket at the first socket, and the beam is provided with a through hole configured to avoid the first optical connector. The end portion of the first electrical connector mounting portion away from the first electrical connector connecting portion may be located between the two first optical connectors and fixed to the beam.

In a possible implementation, a part of the first electrical connector conductive portion extending out of the first electrical connector mounting portion is fixed to an outer surface of a side wall of the first electrical connector connecting portion.

In some examples, the first electrical connector conductive portion may be of a strip structure, for example, a strip metal sheet or a strip metal rod. A part of the first electrical connector conductive portion extending out of the first electrical connector mounting portion is attached to an outer surface of a side wall of the first electrical connector connecting portion.

In a possible implementation, a part of the first electrical connector conductive portion extending out of the first electrical connector mounting portion is fixed inside the first electrical connector connecting portion and extends out of an end face of the first electrical connector connecting portion away from the first electrical connector mounting portion.

In some examples, the first electrical connector conductive portion may be of a strip structure, for example, a strip metal rod. A part of the first electrical connector conductive portion extending out of the first electrical connector mounting portion is fixed inside the first electrical connector connecting portion, and extends out of an end face of the first electrical connector connecting portion away from the first electrical connector mounting portion. For example, one end of the first electrical connector conductive portion is electrically connected to the power supply line, and the other end of the first electrical connector conductive portion sequentially passes through the first electrical connector mounting portion and the first electrical connector connecting portion, and extends out of an end face of the first electrical connector connecting portion.

In a possible implementation, a part of the first electrical connector conductive portion extending out of the first electrical connector mounting portion is fixed to a surface of an inner wall of a hollow structure of the first electrical connector connecting portion; and the hollow structure is a structure that is provided inside the first electrical connector connecting portion and is provided with an opening on an end face of the first electrical connector connecting portion away from the first electrical connector mounting portion.

In some examples, a hollow structure is provided inside the first electrical connector connecting portion, the hollow structure is provided with an opening on an end face of the first electrical connector connecting portion away from the first electrical connector mounting portion, and a part of the first electrical connector conductive portion of the strip structure extending out of the first electrical connector mounting portion may be attached to a surface of an inner wall of the hollow structure.

In a possible implementation, a first side wall and a second side wall of the first electrical connector mounting portion that are opposite each are provided with a guide block, and a first inner wall and a second inner wall of the first socket that are opposite each are provided with a guide groove; the guide block on the first side wall is located in the guide groove on the first inner wall, and the guide block on the second side wall is located in the guide groove on the second inner wall; and the first inner wall is an inner wall of the first socket located at the bottom, and the second inner wall is an inner wall of the first socket located at the top.

The guide block may be a strip protruding structure located on an outer surface of a side wall of the first electrical connector mounting portion, the corresponding guide groove may be a strip groove structure located on a surface of the inner wall of the first socket, and the guide block matches the guide groove. For example, a size of the guide block matches a size of the guide groove, and a position of the guide block corresponds to a position of the guide groove.

In this way, when the power supply component is mounted in the housing, the first electrical connector faces the first socket, the guide block on the first side wall of the first electrical connector mounting portion slides in the guide groove on the first inner wall of the first socket, and the guide block on the second side wall of the first electrical connector mounting portion slides in the guide groove on the second inner wall of the first socket until the guide block on the first side wall is limited in the guide groove on the first inner wall and the guide block on the second side wall is limited in the guide groove on the second inner wall. After the guide blocks stop sliding in the guide grooves, the power supply component is mounted in the housing.

In a possible implementation, a width of the guide block gradually decreases from a first end portion of the guide block away from the first socket to a second end portion of the guide block close to the first socket; and a groove width of the guide groove gradually decreases from a first groove end of the guide groove away from the first socket to a second groove end of the guide groove close to the first socket.

In some examples, when the guide block slides in the guide groove, a width of the guide block gradually increases, and a groove width of the guide groove gradually decreases, so that the guide block does not slide out of the guide groove when the guide block slides in the guide groove, and the guide block can be limited in the guide groove.

In a possible implementation, the optical-to-electrical conversion component and the power supply line are superimposed.

In an example, the optical-to-electrical conversion component and the power supply line are independent of each other. The optical-to-electrical conversion component of the optical component is located at one layer, the power supply line of the power supply component is located at one layer, and the two layers are placed in a superimposed state.

In a possible implementation, the power supply line and the optical-to-electrical conversion component are integrated.

In some examples, the power supply line and the optical-to-electrical conversion component are integrated together to obtain an optical-to-electrical composite component. The optical-to-electrical composite device may include a circuit board. A first-part flat cable in flat cables of the circuit board is electrically connected to the first optical connector and the second optical connector respectively, to form the optical-to-electrical conversion component. A second-part flat cable in the flat cables of the circuit board is electrically connected to the first electrical connector and the second electrical connector respectively, to form the power supply line.

In a possible implementation, the second electrical connector is located between the second optical connector and an inner wall of the second socket located at the top.

In some examples, the second optical connector and the second electrical connector are independent of each other and are superimposed in the second socket. For example, the second electrical connector may be mounted on an inner wall of the second socket located at the top, and the second optical connector is located in the second socket.

In a possible implementation, the second electrical connector includes a second electrical connector mounting portion and a second electrical connector conductive portion; and the second electrical connector mounting portion is fixed to the inner wall of the second socket located at the top, the second electrical connector conductive portion is fixed to the second electrical connector mounting portion, and the second electrical connector conductive portion is electrically connected to the power supply line.

The second electrical connector mounting portion may be made of a plastic part or the like, and the second electrical connector conductive portion may be made of metal or the like.

In some examples, the second electrical connector mounting portion is of a platy structure, and is mounted on the inner wall of the second socket located at the top. For example, the second electrical connector mounting portion may be fixed to the inner wall of the second socket located at the top through clamping. For another example, the second electrical connector mounting portion may be fixed to the inner wall of the second socket located at the top through gluing.

The second electrical connector mounting portion is used as a carrier of the second electrical connector conductive portion, the second electrical connector conductive portion may be fixed to the second electrical connector mounting portion, and the second electrical connector conductive portion is further electrically connected to the power supply line.

In a possible implementation, the second electrical connector conductive portion is a metal sheet; and the second electrical connector conductive portion is fixed to an outer surface of the second electrical connector mounting portion, and the outer surface of the second electrical connector mounting portion is a surface parallel to an insertion and removal direction of the composite module.

In some examples, the second electrical connector conductive portion may be attached to an outer surface of the second electrical connector mounting portion facing the second optical connector. For example, the second electrical connector conductive portion may alternatively be attached to an outer surface of a side wall of the second electrical connector mounting portion. For another example, when the outer surface of the side wall of the second electrical connector mounting portion is fixed to an inner surface of the side wall of the second socket, the second electrical connector conductive portion may alternatively be attached to an outer surface of the second electrical connector mounting portion opposite to the second electrical connector.

In a possible implementation, the second electrical connector conductive portion is a metal rod; and the second electrical connector conductive portion is fixed inside the second electrical connector mounting portion, and extends out of an end face of the second electrical connector mounting portion away from the power supply line.

In some examples, the second electrical connector conductive portion penetrates the inside of the second electrical connector mounting portion, one end of the second electrical connector conductive portion extends out of an end face of the second electrical connector mounting portion close to the power supply line and is electrically connected to the power supply line, and the other end of the second electrical connector conductive portion extends out of an end face of the second electrical connector mounting portion away from the power supply line and is electrically connected to the inserted device.

In a possible implementation, the second electrical connector conductive portion is a strip metal spring plate; the second electrical connector mounting portion is provided with a mounting groove, the mounting groove is provided with a groove opening on an outer surface of the second electrical connector mounting portion, and the outer surface of the second electrical connector mounting portion is a surface parallel to an insertion and removal direction of the composite module; and an end portion of the second electrical connector conductive portion is fixed to a groove wall of the mounting groove, and a contact portion of the second electrical connector conductive portion for electrical connection to an inserted device extends out of the groove opening.

The surface parallel to the insertion and removal direction of the composite module may be the outer surface of the second electrical connector mounting portion facing the second optical connector, the outer surface of the side wall of the second electrical connector mounting portion, the outer surface of the second electrical connector mounting portion opposite to the second optical connector, or the like.

In some examples, the second electrical connector mounting portion is provided with a mounting groove, and the mounting groove is provided with a groove opening on an outer surface facing the second optical connector. One end of the second electrical connector conductive portion of the strip metal spring plate may be fixed to a groove wall of the mounting groove, the other end of the second electrical connector conductive portion may be suspended in the mounting groove, and a contact portion of the second electrical connector conductive portion extends out of the groove opening, where the contact portion is a part of the second electrical connector conductive portion configured to electrically connect to the inserted device. For example, the contact portion may be a bent portion close to an end portion of the second electrical connector conductive portion or the contact portion may be an end portion of the second electrical connector conductive portion. The contact portion extends out of the groove opening of the mounting groove, so that when the composite module is inserted into a device, the contact portion may be in contact with a conductive portion in the inserted device to implement an electrical connection.

In a possible implementation, the second electrical connector and the second optical connector are integrated to obtain an optical/electrical composite connector; the optical/electrical composite connector includes an optical/electrical composite connector carrier and an edge connector, where the edge connector is fixed to a surface of the optical/electrical composite carrier, and the surface of the optical/electrical composite carrier is a surface parallel to an insertion and removal direction of the composite module; and a first-part metal sheet in the edge connector is electrically connected to the optical-to-electrical conversion component to form the second optical connector, and a second-part metal sheet in the edge connector is electrically connected to the power supply line to form the second electrical connector.

The edge connector is formed by a plurality of conductive contacts, and is laid on two opposite surfaces of the carrier.

In an example, the second electrical connector and the second optical connector are integrated together to obtain an optical/electrical composite connector. The optical/electrical composite connector includes an optical/electrical composite carrier and an edge connector. The optical/electrical composite carrier is of a platy structure, for example, may be a part of the circuit board close to an end portion. The edge connector may be located on a surface of the optical/electrical composite carrier, for example, may be located on two opposite surfaces of the optical/electrical composite carrier. A part of metal sheets in the edge connector may be electrically connected to the optical-to-electrical conversion component, to form the second optical connector, and the other part of the metal sheets in the edge connector may be electrically connected to the power supply line, to form the second electrical connector. For example, a first-part metal sheet in the edge connector is electrically connected to the optical-to-electrical conversion component to form the second optical connector, and a second-part metal sheet in the edge connector is electrically connected to the power supply line to form the second electrical connector.

In this way, the second optical connector and the second electrical connector are integrated together, so that mounting space of the composite module can be reduced, and miniaturization development of the composite module is facilitated.

In a possible implementation, the power supply component is configured to transmit electric energy and a data signal, and the data signal includes a signal used to adjust optical power of the optical component and a signal indicating that the optical module is abnormal.

In a possible implementation, the composite module is configured to determine, when detecting that an inserted optical communication device is a powered device, a power consumption level of the optical communication device, and transmit electric energy to the optical communication device based on the power consumption level of the optical communication device.

In another aspect, a manufacturing method for a composite module is provided, where the composite module is the composite module described above, and the manufacturing method includes: connecting a first optical connector to one end of an optical-to-electrical conversion component, and connecting a second optical connector to the other end of the optical-to-electrical conversion component, to obtain an optical component; connecting a first electrical connector to one end of a power supply line, and connecting a second electrical connector to the other end of the power supply line, to obtain a power supply component; and mounting the obtained optical component and the obtained power supply component in the housing, where both the first optical connector and the first electrical connector are located in a first socket of the housing, and both the second optical connector and the second electrical connector are located in a second socket of the housing.

For example, a possible manufacturing manner of the composite module may be that the composite module may be manufactured based on an optical module. For example, a housing of the optical module is opened, and a cable or a flexible circuit board may be laid on an inner surface of an inner wall of the housing close to an upper cover or close to a base, or a flat cable or the like may be directly arranged on a circuit board of the optical module, to serve as a power supply line of the power supply component. Then, a first electrical connector is mounted on an outer surface of a beam of the optical module, and a first electrical connector conductive portion of the first electrical connector is electrically connected to the power supply line. Then, a second electrical connector is mounted at a position of the housing of the optical module close to a second optical connector. The second electrical connector may be mounted on an inner surface of the housing close to the second optical connector, or may be integrated onto the second optical connector. For example, an edge connector of the second optical connector is usually provided with a reserved metal sheet, and the reserved metal sheet may be used as a second optical connector conductive portion of the second optical connector.

A specific manufacturing and mounting process of the composite module is not specifically limited in this embodiment, provided that both the optical-to-electrical conversion component of the optical component and the power supply line of the power supply component can be located in the housing, the first optical connector of the optical component and the first electrical connector of the power supply component can be located in the first socket of the housing, and the second optical connector of the optical component and the second electrical connector of the power supply component can be located in the second socket.

The composite module not only includes the optical component for implementing conversion between an optical signal and an electrical signal, but also includes the power supply component for implementing poe power supply. The second optical connector of the optical component and the second electrical connector of the power supply component are located in a same socket of the housing, that is, the second socket of the housing. In this way, as an inserted device, an optical port configured to insert an optical module and an electrical port configured to insert a power connector of the inserted device are also located in a same port. For example, only ports configured to insert the composite module need to be provided on panels of a switch and an ap, thereby reducing sizes of the panels of the switch and the ap, and facilitating miniaturization development of the switch and the ap.

REFERENCE NUMERALS

Figure 1:
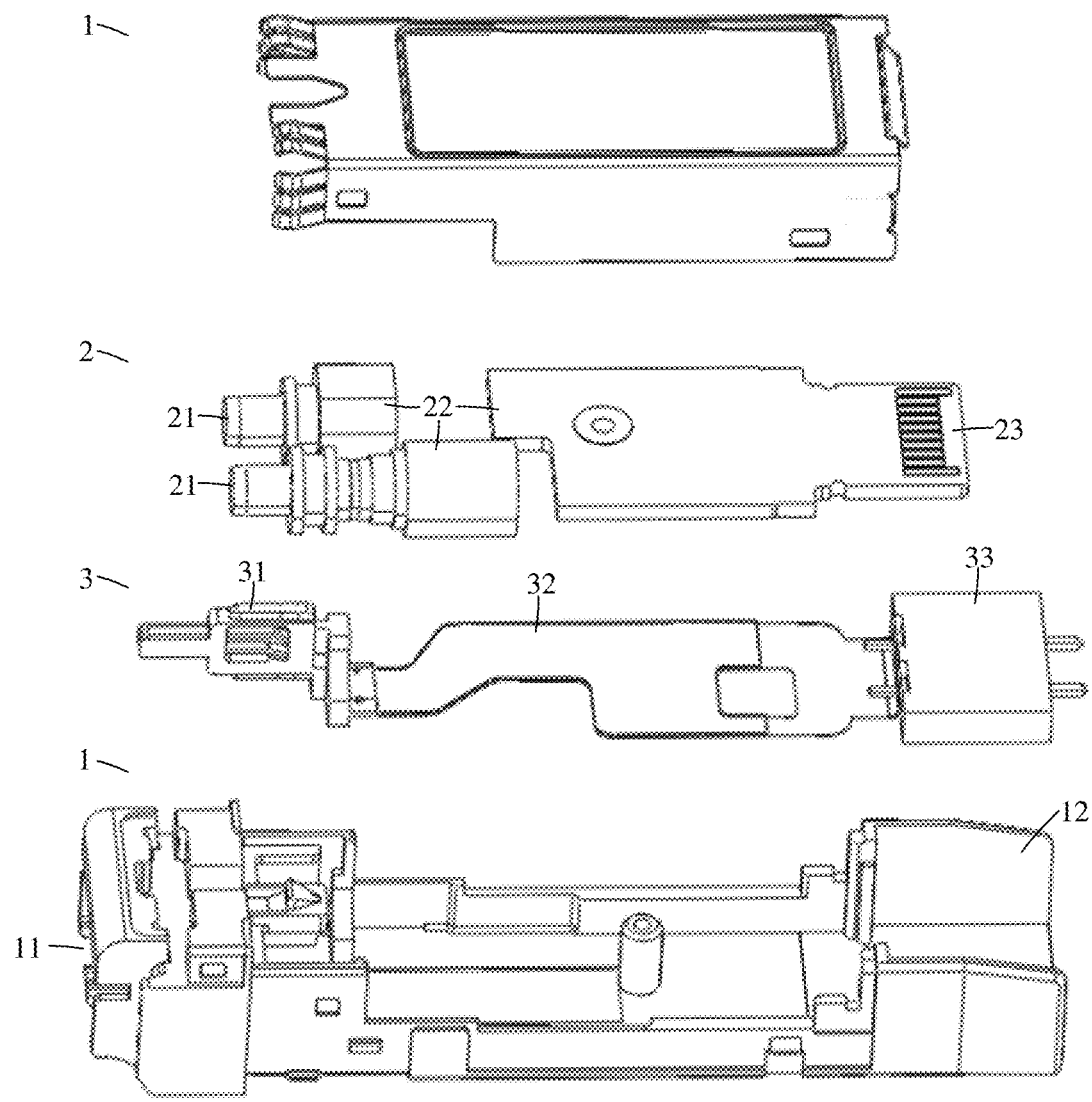
FIG. 1 is a schematic exploded view of a structure of a composite module according to this application.

1. Housing; 11. First socket; 11*a*. First inner wall; 11*b*. Second inner wall; 12. Second socket; 13. Beam; 111. Guide groove; 111*a*. First groove end of the guide groove 111; and 111*b*. Second groove end of the guide groove 111.
2. Optical component; 21. First optical connector; 22. Optical-to-electrical conversion component; and 23. Second optical connector.

20. Optical/electrical composite connector; 201. Optical/electrical composite carrier; 202. Edge connector; 202a. First-part metal sheet; and 202b. Second-part metal sheet.

3. Power supply component; 31. First electrical connector; 32. Power supply line; and 33. Second electrical connector.

30. Optical/electrical composite component; 301. Circuit board; 301a. First-part flat cable; and 301b. Second-part flat cable.

311. First electrical connector mounting portion; 311a. First side wall; 311b. Second side wall; 312. First electrical connector connecting portion; 313. First electrical connector conductive portion; 314. Guide block; 314a. First end portion of the guide block 314; 314b. Second end portion of the guide block 314; and 315. Hollow structure.

331. Second electrical connector mounting portion; 332. Second electrical connector conductive portion; 333. Mounting groove; and 332a. Contact portion.

DETAILED DESCRIPTION OF ILLUSTRATIVE EMBODIMENTS

In some related solutions, at least two ports need to be provided on panels of a switch and an ap. One port is used as an optical port to insert an optical module, and the other port is used as an electrical port to insert a power connector. This occupies a large panel size, and does not facilitate miniaturization development of the switch and the ap.

Embodiments of this application provide a composite module. The composite module may also be referred to as an optical/electrical composite module. On one hand, the composite module may be configured to perform conversion between an optical signal and an electrical signal, and on the other hand, the composite module may be configured to implement power over Ethernet power supply. Power over Ethernet power supply, also referred to as poe power supply, is a technology that can supply power to some devices such as an IP (Internet Protocol) telephone set, an AP (access point) device, and a network camera while transmitting a data signal.

The composite module may be a module configured to convert an optical signal into an electrical signal, or may be a module configured to convert an electrical signal into an optical signal, or may be a module that can not only convert an optical signal into an electrical signal, but also convert an electrical signal into an optical signal.

A possible application scenario of the composite module may be that the composite module is used in a connection between a switch and an ap. The composite module is inserted into each of panels of the switch and the ap, and the composite module inserted into the switch and the composite module inserted into the ap are connected through a composite cable, to connect the switch and the ap.

The composite cable is a cable in which an optical fiber and a copper wire are wrapped. The optical fiber is used to transmit an optical signal, and the copper wire is used to transmit electric energy.

When the composite module is used in the connection between the switch and the ap, the composite module may be used together with optical communication devices such as the switch and the ap, or may be used together with the composite cable. A panel of the optical communication device is provided with a port for inserting the composite module, the port is provided with an optical interface connected to an optical connector of the composite module, and the port is further provided with an electrical interface connected to an electrical connector of the composite module. Similarly, a connector of the composite cable is provided with an optical fiber connector connected to the optical connector of the composite module, and is further provided with a power connector connected to the electrical connector of the composite module.

In an embodiment, the composite module includes a component for implementing an optical-to-electrical conversion function and a component for implementing a poe function. The optical connector and the electrical connector are integrated in one socket, so that only one port for inserting the composite module needs to be provided on the panel of the optical communication device cooperating with the composite module, and the port is provided with an electrical interface and an optical interface, which can reduce a size of the panel of the optical communication device and facilitate miniaturization development of the device.

For a type of the composite module, according to functions, the composite module may be any one of an optical receive composite module, an optical transmit composite module, an optical transceiver composite module, an optical forwarding composite module, or the like.

According to pluggability, the composite module may be any one of a pluggable composite module or a non-pluggable composite module.

According to package types, the composite module may be any one of an SFP (small form-factor pluggable optical module) composite module, a GBIC (gigabit interface converter) composite module, an XFP (10 gigabit small form factor pluggable) composite module, or the like.

A specific type of the composite module is not specifically limited in this embodiment. The following describes in detail a specific structure of the composite module for implementing the optical-to-electrical conversion function and the PoE power supply function.

Figure 2:
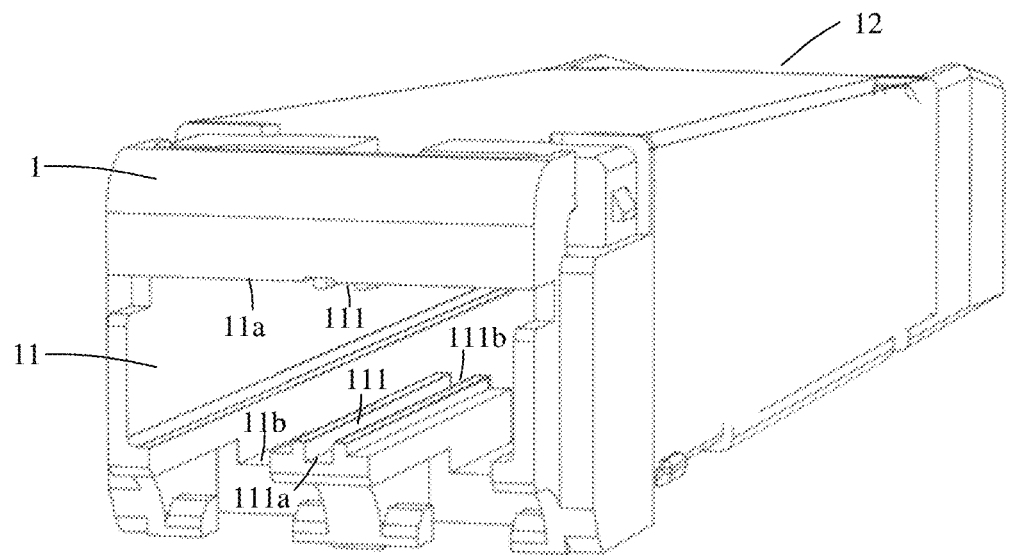
FIG. 2 is a schematic diagram of a structure of a housing of a composite module according to this application.

As shown in FIG. 1, the composite module includes a housing 1, an optical component 2, and a power supply component 3. As shown in FIG. 2, a first end of the housing 1 is provided with a first socket 11, and a second end of the housing 1 is provided with a second socket 12. The optical component 2 includes a first optical connector 21, an optical-to-electrical conversion component 22, and a second optical connector 23. One end of the optical-to-electrical conversion component 22 is connected to the first optical connector 21, and the other end of the optical-to-electrical conversion component is connected to the second optical connector 23. The power supply component 3 includes a first electrical connector 31, a power supply line 32, and a second electrical connector 33. One end of the power supply line 32 is connected to the first electrical connector 31, and the other end of the power supply line is connected to the second electrical connector 33. Both the optical-to-electrical conversion component 22 and the power supply line 32 are located in the housing 1, the first optical connector 21 is located in the first socket 11, the first electrical connector 31 is exposed from the housing 1, and both the second optical connector 23 and the second electrical connector 33 are located in the second socket 12.

The housing 1, as a protection housing of the composite module, is configured to protect components inside the composite module, to implement protection, dust-proof, and water-proof functions. The optical component 2 is a component configured to implement conversion between an optical signal and an electrical signal. The power supply component 3 is a component configured to implement poe power supply.

The first optical connector 21 is located in the first socket 11, so that an optical fiber connector of a composite cable is connected to the first optical connector 21 at the first socket 11. The first electrical connector 31 is exposed from the housing 1, so that a power connector of the composite cable is electrically connected to the first electrical connector 31.

The following separately describes the housing 1, the optical component 2, and the power supply component 3 of the composite module.

In an example, as shown in FIG. 2, a contour shape of the composite module may be a box-shaped structure of a cuboid. Correspondingly, a shape of the housing 1 may also be a box-shaped structure of a cuboid. In an example, the housing 1 may be a box-shaped structure of a cuboid with openings at two ends in the length direction. One of the openings at the two ends is used as the first socket 11, and the other of the openings at the two ends is used as the second socket 12. In another example, the housing 1 may include an upper cover and a base, and the upper cover and the base are fixed to form the housing 1. For example, the upper cover may be of a cover-shaped structure and covers the base. For another example, the upper cover is in a plate shape, the base is in a box shape without a cover, and the upper cover covers the base. Specific structures of the upper cover and the base are not limited in this embodiment, provided that a box-shaped structure with openings at two ends can be formed after the upper cover and the base are fixed.

As shown in FIG. 2, the first end of the housing 1 in a length direction is provided with the first socket 11, and the second end of the housing is provided with the second socket 12. The first socket 11 may be used as a socket for a composite cable to be inserted, and the second socket 12 may be used as a socket for the composite module to be inserted into a device.

The housing 1 of the composite module is described above, and the following separately describes the optical component 2 and the power supply component 3 of the composite module.

Figure 3:
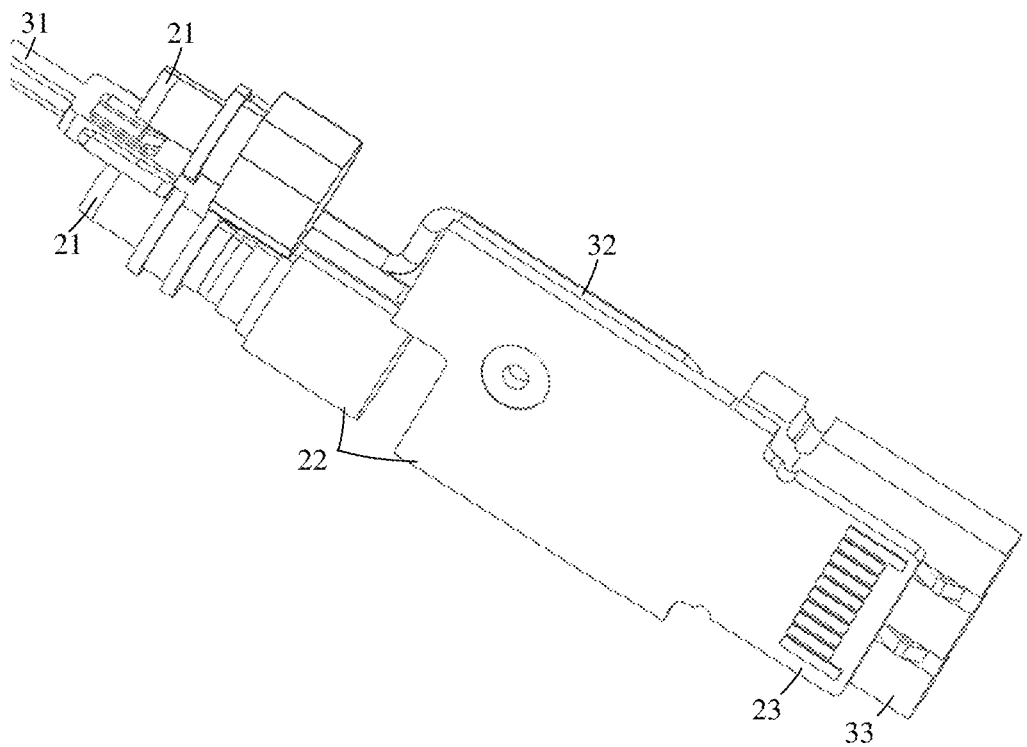
FIG. 3 is a schematic diagram of a structure of mounting of an optical component and a power supply component of a composite module according to this application.
Figure 4:
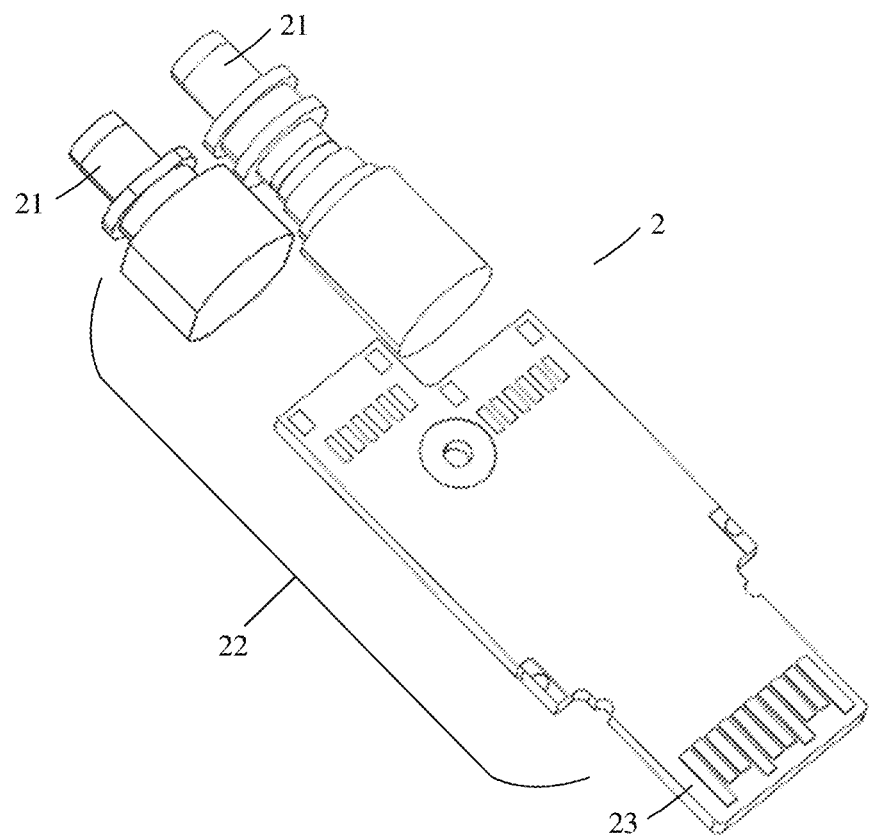
FIG. 4 is a schematic diagram of a structure of an optical component of a composite module according to this application.

The optical component 2 may also be referred to as an optical-electronic component. As shown in FIG. 3 and FIG. 4, the optical component may include the first optical connector 21, the optical-to-electrical conversion component 22, and the second optical connector 23. One end of the optical-to-electrical conversion component 22 is connected to the first optical connector 21, and the other end of the optical-to-electrical conversion component is connected to the second optical connector 23. The connection between the optical connector and the optical-to-electrical conversion component 22 may include a physical connection and an electrical connection.

The optical-to-electrical conversion component 22 is a component required for implementing an optical-to-electrical conversion function, and may include, for example, a laser, a detector, an amplifier, clock data recovery, and a drive chip.

In an example, one of the first optical connector 21 and the second optical connector 23 is configured to connect to a composite cable, and the other of the first optical connector and the second optical connector is configured to connect to an inserted device. For example, the first optical connector 21 may be configured to connect to the composite cable, and the second optical connector 23 may be configured to connect to the inserted device. As described above, the first socket 11 may be used as the socket for the composite cable to be inserted, and the second socket 12 may be used as the socket for the composite module to be inserted into the device. Correspondingly, the first optical connector 21 may be located in the first socket 11, and the second optical connector 23 may be located in the second socket 12.

In an example, the composite module may be a two-fiber bidirectional composite module. Correspondingly, as shown in FIG. 4, there are two first optical connectors 21, one is used as a transmitting end, and the other is used as a receiving end. A connection structure between the optical component 2 and a circuit board in FIG. 4 is not shown. The composite module may alternatively be a single-fiber bidirectional composite module. Correspondingly, there is one first optical connector 21, which serves as both a transmitting end and a receiving end. Whether the composite module is the two-fiber bidirectional module or the single-fiber bidirectional module is not limited in this embodiment, and the two-fiber bidirectional module may be used as an example in the accompanying drawings.

The main structure of the optical component 2 of the composite module is described above, and the following describes the power supply component 3 of the composite module.

Figure 5:
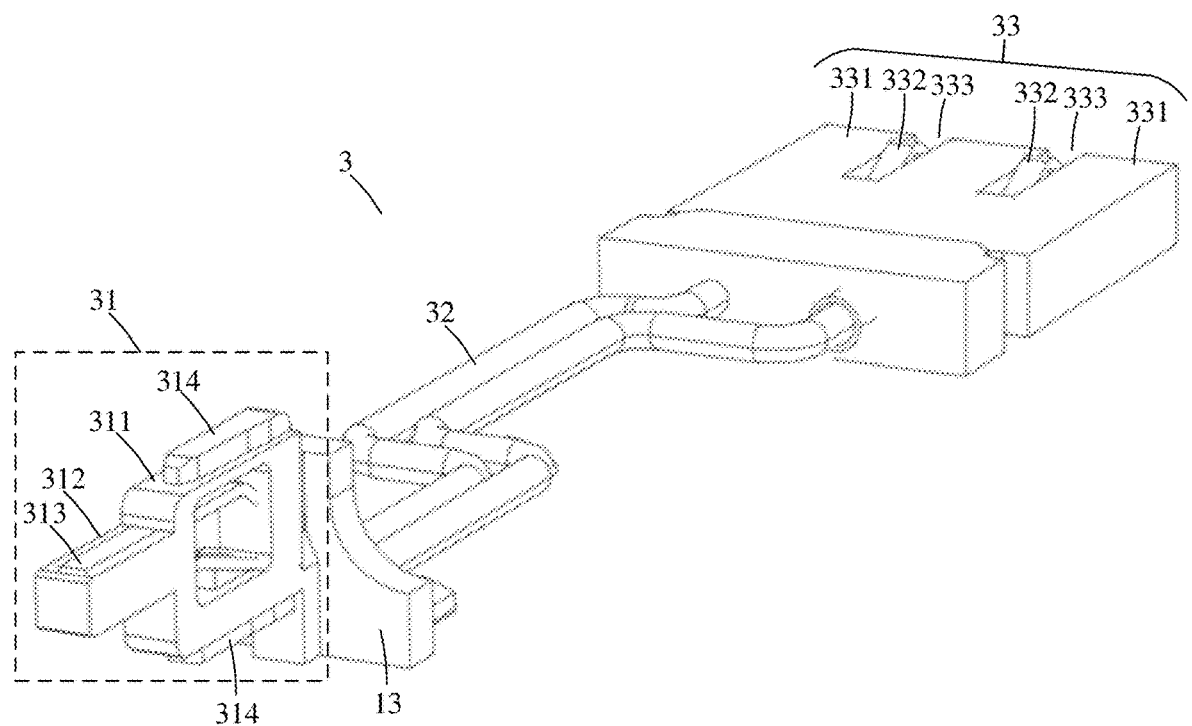
FIG. 5 is a schematic diagram of a structure of a power supply component of a composite module according to this application.

FIG. 5 is a schematic diagram of a structure of a power supply component 3. The power supply component 3 includes components required by the composite module for implementing a poe power supply function, and may include a power supply line 32 and a first electrical connector 31 and a second electrical connector 33 that are located at two ends of the power supply line 32.

In an example, the power supply line 32 may be a cable, a flexible circuit board, a circuit board, or the like. One of the first electrical connector 31 and the second electrical connector 33 is configured to connect to the composite cable, and the other of the first electrical connector and the second electrical connector is configured to connect to the device into which the composite module is inserted. For example, the first electrical connector 31 is configured to connect to the composite cable, and the second electrical connector 33 is configured to connect to the inserted device. As described above, the second socket 12 may be used as the socket for the composite module to be inserted into the device. Correspondingly, the second electrical connector 33 is located in the second socket 12.

As described above, the first electrical connector 31 is exposed from the housing 1. For example, the first electrical connector 31 may be located at an end face of the housing 1 close to the first socket 11. For another example, the first electrical connector 31 may alternatively be located in the first socket 11. A specific position of the first electrical connector 31 is not limited in this embodiment, provided that the first electrical connector can be exposed from the housing 1, to implement an electrical connection with a power connector of the composite cable. In this embodiment, an example in which the first electrical connector 31 is located in the first socket 11 may be used for description.

Figure 6:
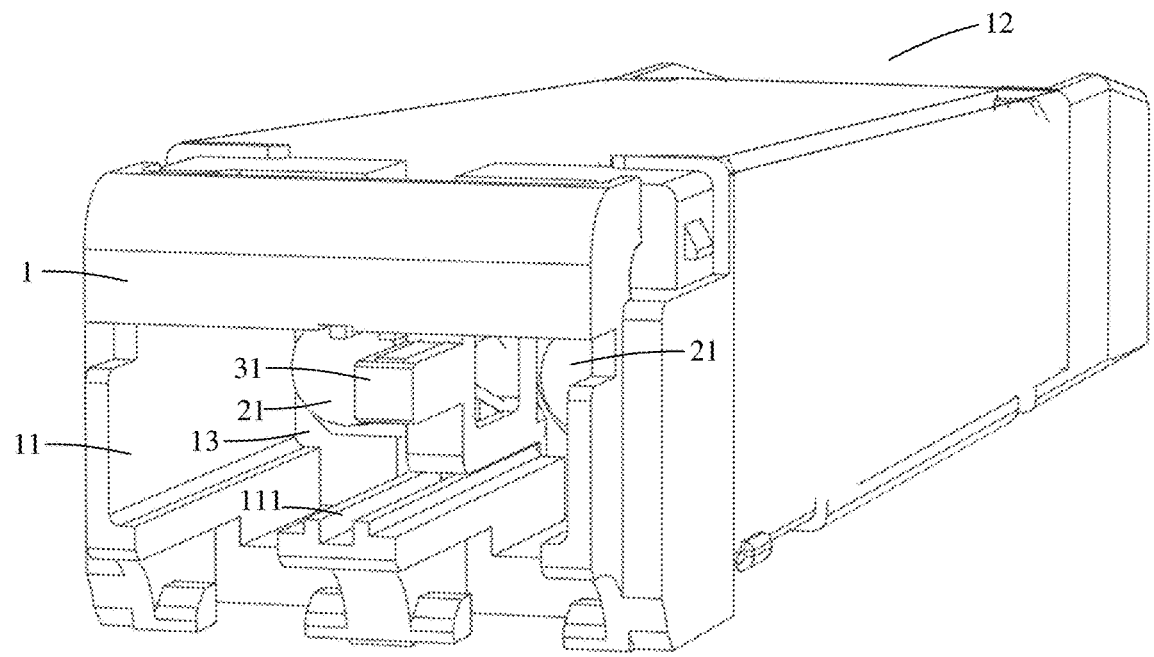
FIG. 6 is a schematic diagram of a structure of a composite module according to this application.
Figure 7:
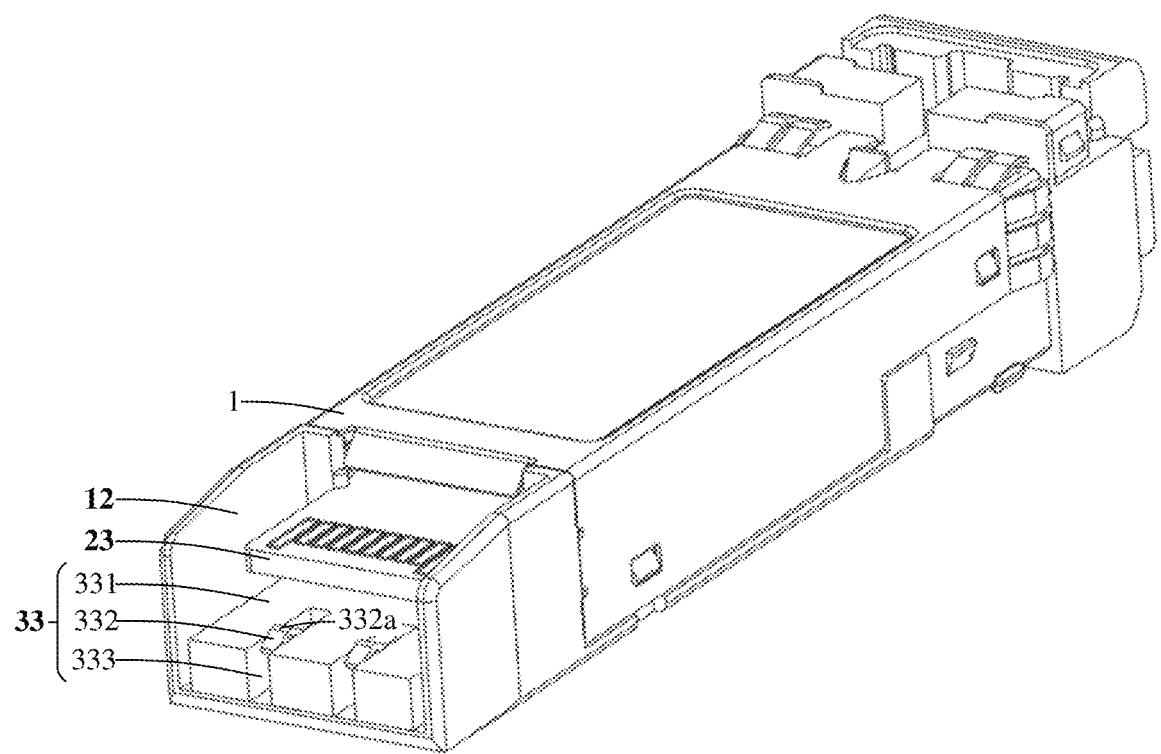
FIG. 7 is a schematic diagram of a structure of a composite module according to this application.

Based on the foregoing description, both the optical-to-electrical conversion component 22 of the optical component 2 and the power supply line 32 of the power supply component 3 are located in the housing 1, the housing 1 is provided with the first socket 11 for the composite cable to be inserted and the second socket 12 to be inserted into the device, and both the optical component 2 and the power supply component 3 are located in the housing 1. As shown in FIG. 6, both the first optical connector 21 connected to one end of the optical-to-electrical conversion component 22 and the first electrical connector 31 connected to one end of the power supply line 32 are located in the first socket 11. As shown in FIG. 7, both the second optical connector 23 connected to the other end of the optical-to-electrical conversion component 22 and the second electrical connector 33 connected to the other end of the power supply line 32 are located in the second socket 12. In this way, the power supply component 3 for implementing a poe power supply function and the optical component 2 for implementing an optical-to-electrical conversion function are integrated together to obtain the composite module. Therefore, only interfaces for inserting the composite module need to be provided on panels of an inserted device, for example, a switch and an ap, and no interface for inserting a power connector needs to be provided, thereby reducing sizes of the panels of the switch and the ap, and facilitating miniaturization development of the switch and the ap.

The following describes in detail a position relationship between the first optical connector 21 of the optical component 2 and the first electrical connector 31 of the power supply component 3, and a specific implementation structure of the first electrical connector 31.

In an example, the composite module may be a two-fiber bidirectional composite module. As shown in FIG. 6, there are two first optical connectors 21, and the first electrical connector 31 is located between the two first optical connectors 21.

Figure 8:
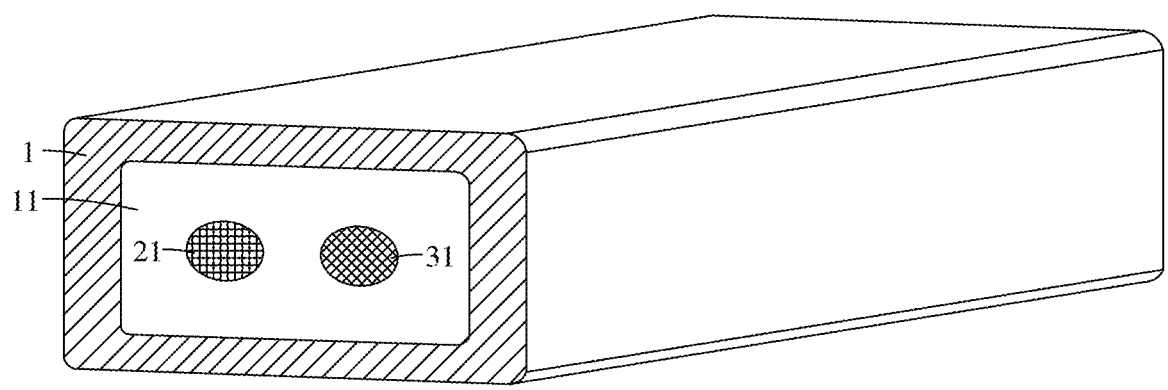
FIG. 8 is a schematic diagram of a structure of a position relationship between a first optical connector and a first electrical connector of a composite module according to this application.

In another example, the composite module may alternatively be a single-fiber bidirectional composite module, and the first electrical connector 31 may be located at any position around the first optical connector 21. For example, as shown in FIG. 8, the first electrical connector 31 and the first optical connector 21 may be located in the first socket 11 side by side in the left-right direction. For another example, the first electrical connector 31 and the first optical connector 21 may alternatively be located in the first socket 11 side by side in the up-down direction.

A quantity of first optical connectors 21 is not limited in this embodiment, and a relative position relationship between the first electrical connector 31 and the first optical connector 21 is not specifically limited in this embodiment. A skilled person can flexibly select the relative position relationship between the first optical connector 21 and the first electrical connector 31 based on an actual situation. In the accompanying drawings, the two-fiber bidirectional composite module may be used as an example, and the first electrical connector 31 is located between the two first optical connectors 21.

Figure 9:
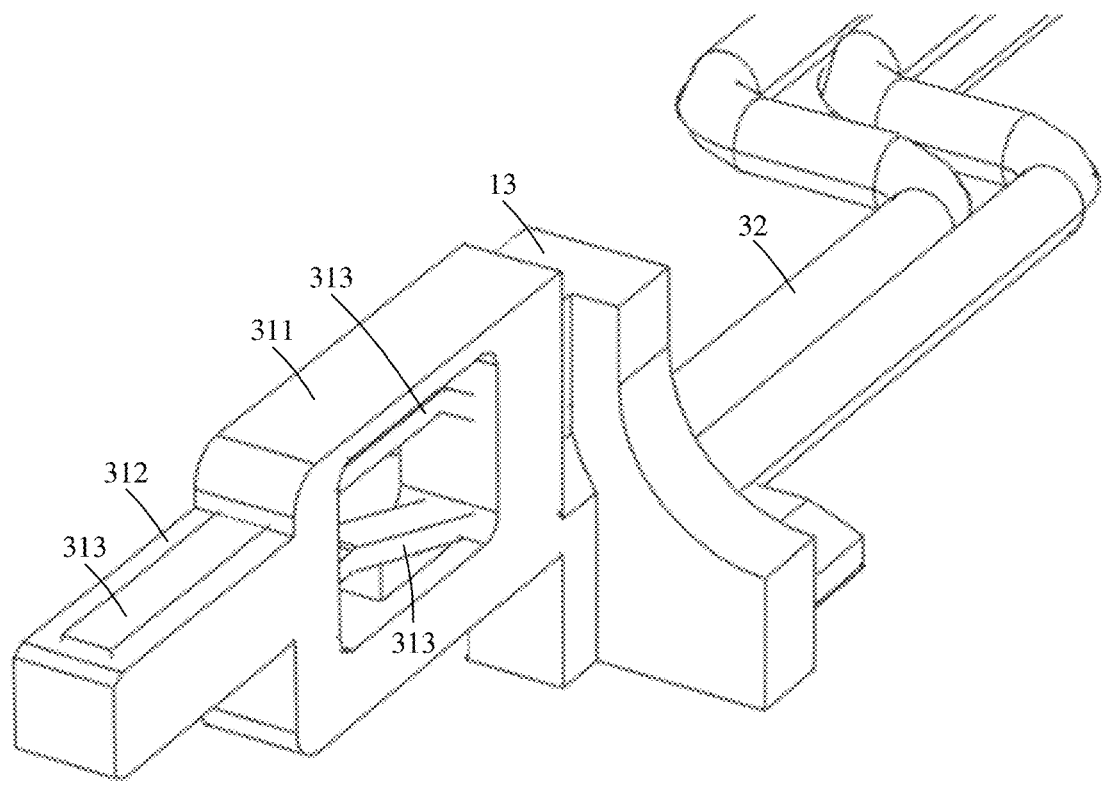
FIG. 9 is a schematic partial view of a structure of a first electrical connector of a composite module according to this application.

For the specific implementation structure of the first electrical connector 31, as shown in FIG. 9, the first electrical connector 31 includes a first electrical connector mounting portion 311, a first electrical connector connecting portion 312, and a first electrical connector conductive portion 313. One end of the first electrical connector mounting portion 311 is fixed to the first electrical connector connecting portion 312, and the other end of the first electrical connector mounting portion is fixed to the housing 1. The first electrical connector conductive portion 313 is of a strip structure, one end of the first electrical connector conductive portion is electrically connected to the power supply line 32, the other end of the first electrical connector conductive portion extends out of the first electrical connector mounting portion 311, and the first electrical connector conductive portion 313 is fixed to the first electrical connector connecting portion 312.

The first electrical connector mounting portion 311 is configured to be fixed to the housing 1 and may be made of a plastic part or the like. The first electrical connector connecting portion 312 is configured to plug-connect to the composite cable, for example, be plug-connected to a power connector of the composite cable, and may also be made of a plastic part or the like. The first electrical connector conductive portion 313 is configured to electrically connect to a copper wire in the composite cable, and may be made of metal or the like.

In an example, as shown in FIG. 9, the first electrical connector mounting portion 311 is fixed to the first electrical connector connecting portion 312. For example, an end portion of the first electrical connector mounting portion 311 is fixedly connected to an end portion of the first electrical connector connecting portion 312 through gluing, screws, or the like. For another example, the first electrical connector mounting portion 311 and the first electrical connector connecting portion 312 are integrally formed. As shown in FIG. 9, the first electrical connector mounting portion 311 and the first electrical connector connecting portion 312 are two parts of a board body. A height of the first electrical connector mounting portion 311 is higher than a height of the first electrical connector connecting portion 312 because the top and the bottom of the first electrical connector mounting portion 311 are used to be fixedly connected to the top and the bottom of the first socket 11 respectively, and the height of the first electrical connector mounting portion matches a height of the first socket 11. The first electrical connector connecting portion 312 is configured to plug-connect to the power connector of the composite cable, and the height of the first electrical connector connecting portion matches that of the power connector of the composite cable, so that the height of the first electrical connector mounting portion 311 may not be equal to the height of the first electrical connector connecting portion 312. The heights of the first electrical connector mounting portion 311 and the first electrical connector connecting portion 312 are not limited in this embodiment, and can be flexibly selected by a skilled person based on an actual situation.

In an embodiment, an end portion of the first electrical connector mounting portion 311 away from the first electrical connector connecting portion 312 is fixedly connected to the housing 1. For example, the housing 1 is provided with a beam 13 for blocking the first socket 11 at the first socket 11, and the beam 13 may also be referred to as a baffle plate and the beam 13 is provided with a through hole configured to avoid the first optical connector 21. The end portion of the first electrical connector mounting portion 311 away from the first electrical connector connecting portion 312 may be located between the two first optical connectors 21 and fixed to the beam 13.

However, to facilitate mounting of the power supply component 3 in the housing 1, correspondingly, the beam 13 may be divided into three parts: a first part of the beam, a second part of the beam, and a third part of the beam. The second part of the beam is located between the first part of the beam and the third part of the beam. Only the second part of the beam is shown in FIG. 9, and the end portion of the first electrical connector mounting portion 311 away from the first electrical connector connecting portion 312 is specifically fixedly connected to the second part of the beam.

In an example, the first electrical connector conductive portion 313 may be fixed to the first electrical connector connecting portion 312, and is further electrically connected to the power supply line 32. In this way, as shown in FIG. 9, one end of the first electrical connector mounting portion 311 is fixed to the first electrical connector connecting portion 312, the other end of the first electrical connector mounting portion is fixed to the beam 13 of the housing 1, the first electrical connector conductive portion 313 is fixed to the first electrical connector connecting portion 312, and the first electrical connector conductive portion 313 is electrically connected to the power supply line 32. For example, as shown in FIG. 9, one end of the first electrical connector conductive portion 313 is electrically connected to the power supply line 32, and the other end of the first electrical connector conductive portion passes through the first electrical connector mounting portion 311, extends out of the first electrical connector mounting portion 311, and is located on the first electrical connector connecting portion 312.

The first electrical connector conductive portion 313 may penetrate the inside of the first electrical connector mounting portion 311, or one end of the first electrical connector conductive portion may extend out of the first electrical connector mounting portion 311, and the other end of the first electrical connector conductive portion is located inside the first electrical connector mounting portion 311. A part of the first electrical connector conductive portion 313 extending out of the first electrical connector mounting portion 311 is fixed to the first electrical connector connecting portion 312. An end portion of the power supply line 32 may extend into the first electrical connector mounting portion 311 and is electrically connected to one end of the first electrical connector conductive portion 313 located in the first electrical connector mounting portion 311.

The first electrical connector conductive portion 313 may be fixed to the first electrical connector connecting portion 312 in a plurality of manners. For example, as shown in FIG. 9, a part of the first electrical connector conductive portion 313 extending out of the first electrical connector mounting portion 311 is fixed to an outer surface of a side wall of the first electrical connector connecting portion 312.

For example, the first electrical connector conductive portion 313 may be of a strip structure, for example, a strip metal sheet or a strip metal rod. As shown in FIG. 9, the part of the first electrical connector conductive portion 313 extending out of the first electrical connector mounting portion 311 is attached to an outer surface of a side wall of the first electrical connector connecting portion 312, for example, outer surfaces of upper and lower side walls or outer surfaces of left and right side walls. The side wall of the first electrical connector connecting portion 312 may be a surface parallel to an insertion and removal direction of the composite cable, for example, may be an outer surface of the top, or may be an outer surface of the bottom.

Figure 10:
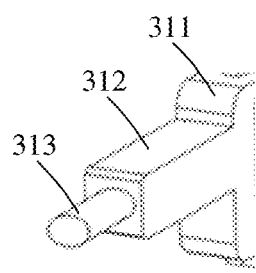
FIG. 10 is a schematic partial view of a structure of a first electrical connector of a composite module according to this application.

For another example, as shown in FIG. 10, a part of the first electrical connector conductive portion 313 extending out of the first electrical connector mounting portion 311 is fixed inside the first electrical connector connecting portion 312 and extends out of an end face of the first electrical connector connecting portion 312 away from the first electrical connector mounting portion 311.

For example, the first electrical connector conductive portion 313 may be of a strip structure, for example, a strip metal rod. As shown in FIG. 10, a part of the first electrical connector conductive portion 313 extending out of the first electrical connector mounting portion 311 is fixed inside the first electrical connector connecting portion 312, and extends out of an end face of the first electrical connector connecting portion 312 away from the first electrical connector mounting portion 311. For example, one end of the first electrical connector conductive portion 313 is electrically connected to the power supply line 32, and the other end of the first electrical connector conductive portion sequentially passes through the first electrical connector mounting portion 311 and the first electrical connector connecting portion 312, and extends out of the end face of the first electrical connector connecting portion 312.

As shown in FIG. 10, the first electrical connector conductive portion 313 is a strip metal rod, one end of the first electrical connector conductive portion extends out of the first electrical connector connecting portion 312, and there are two first electrical connector conductive portions 313 to form a closed loop. FIG. 10 is merely used as an example to illustrate that one end of the first electrical connector conductive portion 313 extends out of the first electrical connector connecting portion 312, and a quantity of first electrical connector conductive portions 313 cannot be limited to one.

Figure 11:
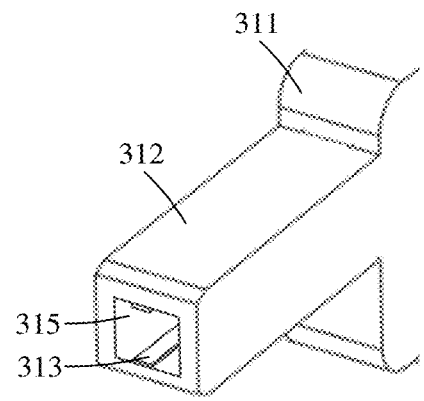
FIG. 11 is a schematic partial view of a structure of a first electrical connector of a composite module according to this application.

For another example, as shown in FIG. 11, a part of the first electrical connector conductive portion 313 extending out of the first electrical connector mounting portion 311 is fixed to a surface of an inner wall of a hollow structure 315 of the first electrical connector connecting portion 312. The hollow structure 315 is a structure that is provided inside the first electrical connector connecting portion 312 and is provided with an opening on an end face of the first electrical connector connecting portion 312 away from the first electrical connector mounting portion 311.

For example, as shown in FIG. 11, the hollow structure 315 is provided inside the first electrical connector connecting portion 312, the hollow structure 315 is provided with an opening on an end face of the first electrical connector connecting portion 312 away from the first electrical connector mounting portion 311, and a part of the first electrical connector conductive portion 313 of the strip structure extending out of the first electrical connector mounting portion 311 may be attached to a surface of an inner wall of the hollow structure 315.

In terms of a shape, the hollow structure 315 may be a columnar through hole shown in FIG. 11, or may be a cylindrical through hole, or may be a cross through hole, or the like. A specific structure of the hollow structure 315 is not limited in this embodiment.

As described above, the first electrical connector 31 is divided into the first electrical connector mounting portion 311, the first electrical connector connecting portion 312, and the first electrical connector conductive portion 313. During actual application, a skilled person may not have the first electrical connector connecting portion 312 but have only the first electrical connector mounting portion and the first electrical connector conductive portion. In this case, the first electrical connector conductive portion 313 is mounted on the first electrical connector mounting portion 311. For a specific fixing position of the first electrical connector conductive portion 313 on the first electrical connector mounting portion 311, refer to a specific fixing position of the first electrical connector conductive portion 313 on the first electrical connector connecting portion 312.

Figure 12:
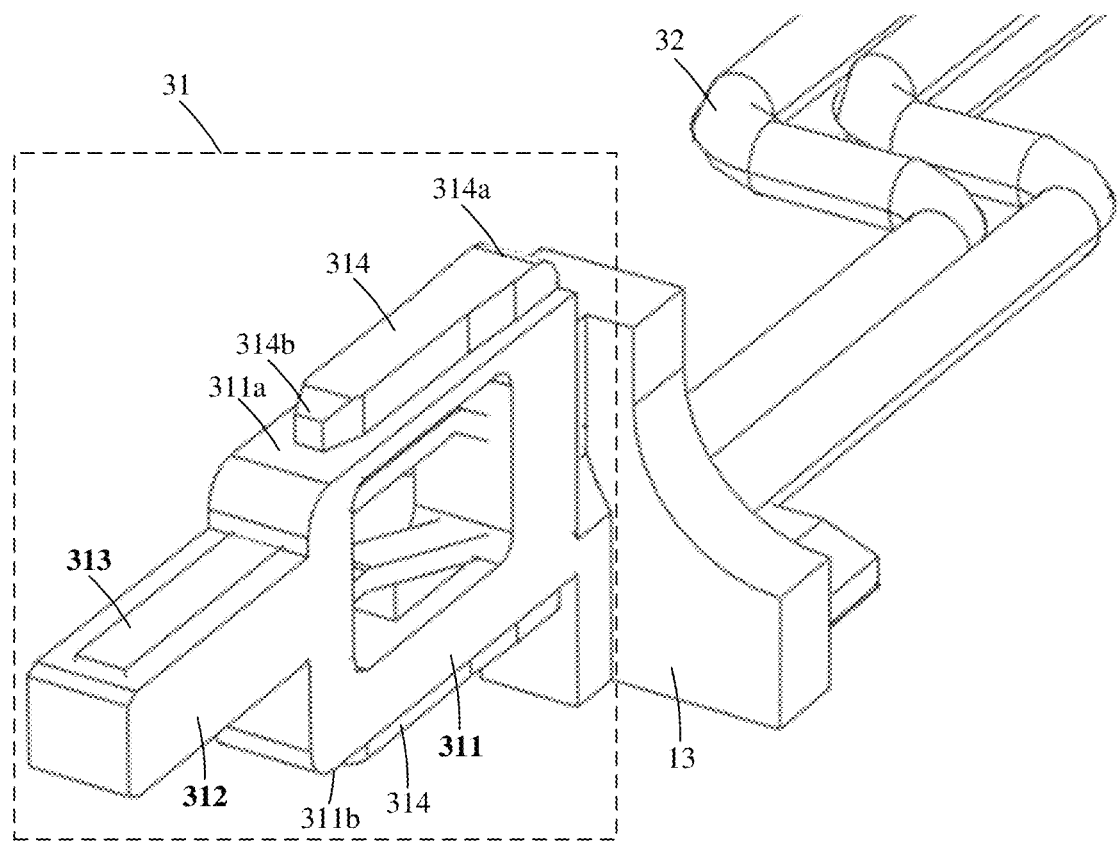
FIG. 12 is a schematic partial view of a structure of a first electrical connector of a composite module according to this application.

To facilitate mounting of the first electrical connector 31 between the two first optical connectors 21, correspondingly, as shown in FIG. 12, a first side wall 311*a* and a second side wall 311*b* of the first electrical connector mounting portion 311 that are opposite each are provided with a guide block 314. A first inner wall 11*a* and a second inner wall 11*b* of the first socket 11 that are opposite each are provided with a guide groove 111. The guide block 314 on the first side wall 311*a* is located in the guide groove 111 on the first inner wall 11*a*, and the guide block 314 on the second side wall 311*b* is located in the guide groove 111 on the second inner wall 11*b*. The first inner wall 11*a* is an inner wall of the housing 1 located at the bottom, and the second inner wall 11*b* is an inner wall of the housing 1 located at the top. For example, the first inner wall 11*a* is an inner wall of the first socket 11 located at the bottom, and the second inner wall 11*b* is an inner wall of the first socket 11 located at the top.

The guide block 314 may be a strip protruding structure located on an outer surface of a side wall of the first electrical connector mounting portion 311, the corresponding guide groove 111 may be a strip groove structure located on a surface of the inner wall of the first socket 11, and the guide block 314 matches the guide groove 111. For example, a size of the guide block 314 matches a size of the guide groove 111, and a position of the guide block 314 corresponds to a position of the guide groove 111.

In this way, when the power supply component 3 is mounted in the housing 1, the first electrical connector 31 faces the first socket 11, the guide block 314 on the first side wall 311*a* of the first electrical connector mounting portion 311 slides in the guide groove 111 on the first inner wall 11*a* of the first socket 11, and the guide block 314 on the second side wall 311*b* of the first electrical connector mounting portion 311 slides in the guide groove 111 on the second inner wall 11*b* of the first socket 11 until the guide block 314 on the first side wall 311*a* is limited in the guide groove 111 on the first inner wall 11*a* and the guide block 314 on the second side wall 311*b* is limited in the guide groove 111 on the second inner wall 11*b*. After the guide blocks 314 stop sliding in the guide grooves 111, the power supply component 3 is mounted in the housing 1.

In an example, in order to enable the guide block 314 to slide in the guide groove 111, correspondingly, as shown in FIG. 12, a width of the guide block 314 gradually decreases from a first end portion 314*a* of the guide block 314 away from the first socket 11 to a second end portion 314*b* of the guide block 314 close to the first socket 11.

For example, a groove width of the guide groove 111 matches the width of the guide block 314. For example, in one case, the groove width of the guide groove 111 gradually decreases from a first groove end 111*a* of the guide groove 111 close to the second socket 12 to a second groove end 111*b* of the guide groove 111 away from the second socket 12. For another example, in another case, the groove width of the guide groove 111 may be greater than a width of the second end portion 314*b* of the guide block 314 and less than a width of the first end portion 314*a* of the guide block 314. In this way, when the guide block 314 slides in the guide groove 111, the width of the guide block 314 gradually increases, and the groove width of the guide groove 111 gradually decreases, so that the guide block 314 does not slide out of the guide groove 111 when sliding in the guide groove 111, and the guide block 314 can be limited in the guide groove 111.

The specific structure of the first electrical connector 31 is described above. The following describes a position relationship between the optical-to-electrical conversion component 22 of the optical component 2 and the power supply line 32 of the power supply component 3, and a specific implementation structure of the power supply line 32.

Figure 13:
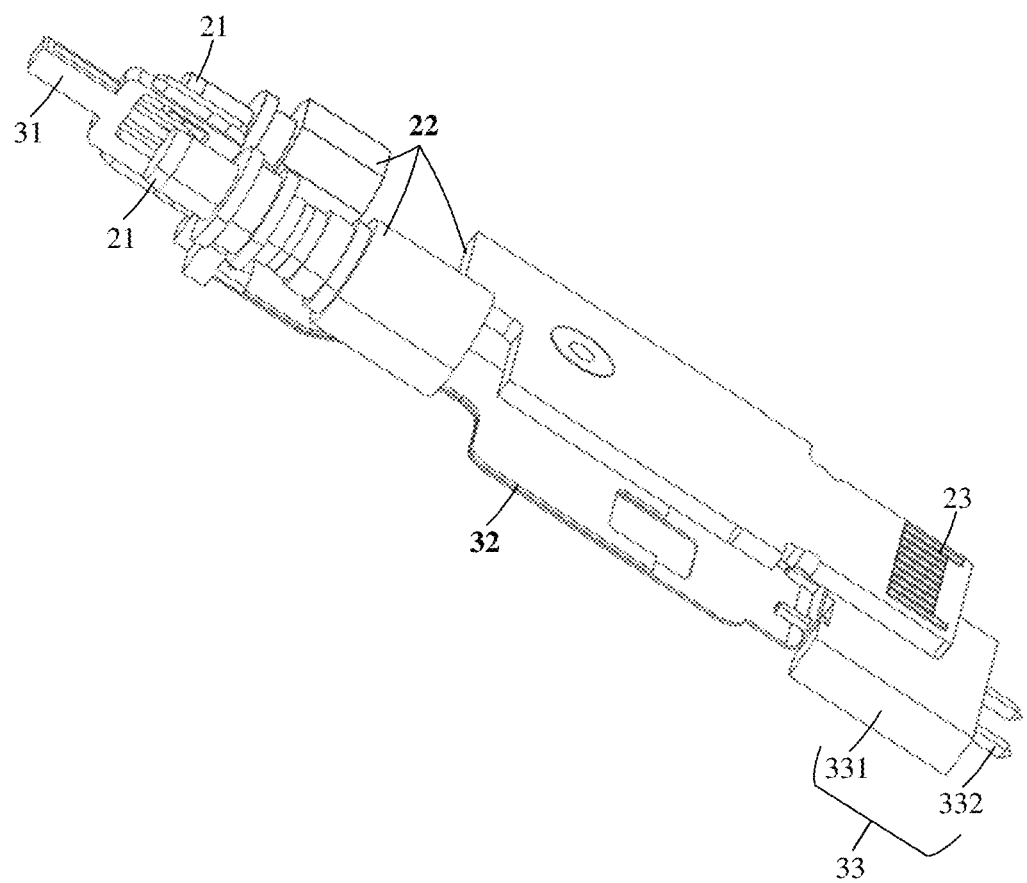
FIG. 13 is a schematic diagram of a structure of a position relationship between an optical component and a power supply component of a composite module according to this application.

As shown in FIG. 13, the optical-to-electrical conversion component 22 and the power supply line 32 are superimposed. For example, the optical-to-electrical conversion component 22 of the optical component 2 is located at one layer, the power supply line 32 of the power supply component 3 is located at one layer, and the two layers are vertically superimposed. For example, as shown in FIG. 13, the optical-to-electrical conversion component 22 may include a laser and a circuit board. The laser and the circuit board are located at a same layer. The power supply line 32 may be a flexible circuit board, and the flexible circuit board is located below the laser and the circuit board. For example, the optical-to-electrical conversion component 22 is close to an inner wall of the bottom of the housing 1, the power supply line 32 is close to an inner wall of the top of the housing 1, and the optical-to-electrical conversion component 22 and the power supply line 32 are vertically superimposed in the housing 1. This position relationship can reduce internal space of the composite module.

In an example, the optical-to-electrical conversion component 22 and the power supply line 32 are vertically superimposed in the housing 1, or the second optical connector 23 and the second electrical connector 33 may be vertically superimposed in the second socket 12, or the second optical connector 23 and the second electrical connector 33 may be integrated together, or the like. This is not limited in this embodiment. The following describes a position relationship between the second optical connector 23 and the second electrical connector 33 in detail.

The power supply line 32 may be a flexible circuit board, a printed circuit board, or a cable in which a copper wire is wrapped. As shown in FIG. 5, the power supply line 32 is a cable.

The optical-to-electrical conversion component 22 and the power supply line 32 may be independent of each other, and are superimposed in the housing 1, or the optical-to-electrical conversion component 22 and the power supply line 32 may be integrated together. The optical-to-electrical conversion component 22 and the power supply line 32 are integrated together, which may be that a flat cable is arranged on the circuit board of the optical-to-electrical conversion component 22 as the power supply line.

Figure 14:
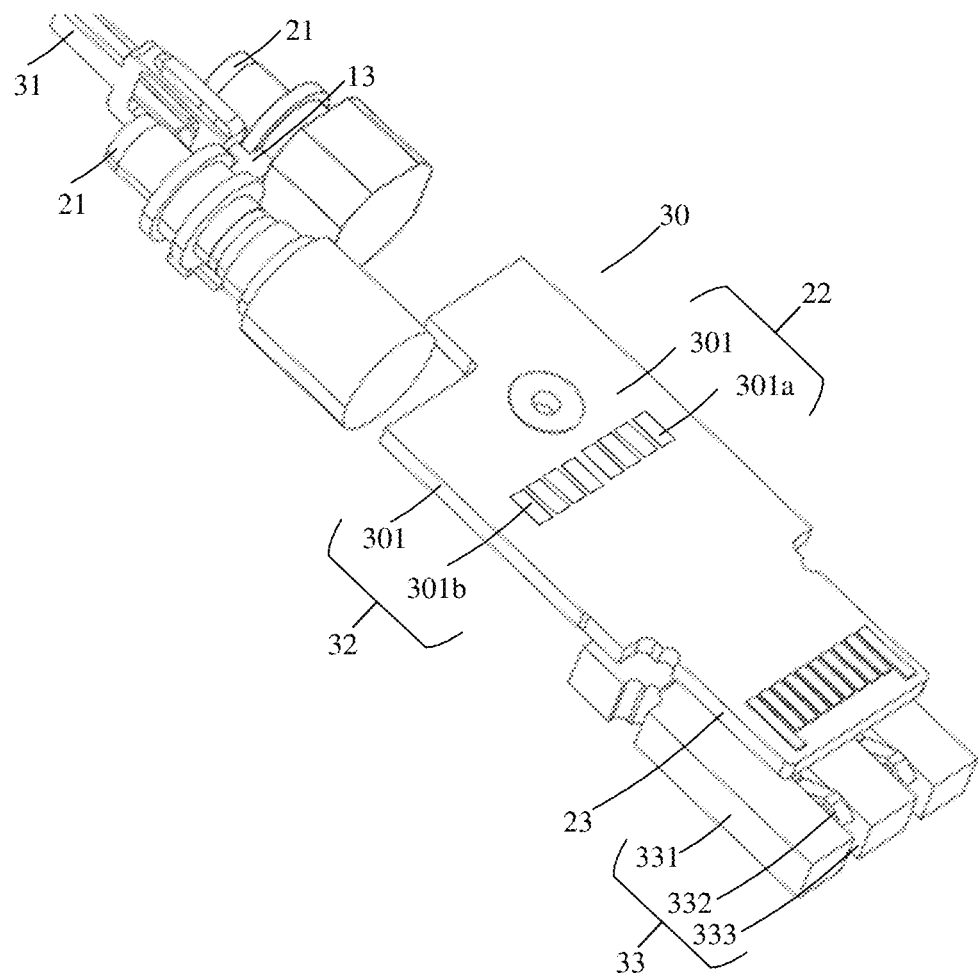
FIG. 14 is a schematic diagram of a structure obtained after an optical component and a power supply component of a composite module are integrated according to this application.

As shown in FIG. 14, the power supply line 32 and the optical-to-electrical conversion component 22 are integrated. For example, as shown in FIG. 14, the power supply line 32 and the optical-to-electrical conversion component 22 are integrated together to obtain an optical/electrical composite component 30. The optical/electrical composite component 30 may include a circuit board 301. A first-part flat cable 301*a* in flat cables of the circuit board 301 is electrically connected to the first optical connector 21 and the second optical connector 23, to form the optical-to-electrical conversion component 22. A second-part flat cable 301*b* in the flat cables of the circuit board 301 is electrically connected to the first electrical connector 31 and the second electrical connector 33, to form the power supply line 32.

The power supply line 32 and the optical-to-electrical conversion component 22 are integrated, and the second optical connector 23 and the second electrical connector 33 may still be independent of each other. As shown in FIG. 14, the power supply line 32 and the optical-to-electrical conversion component 22 are integrated. However, the second optical connector 23 and the second electrical connector 33 are vertically superimposed in the second socket 12.

Figure 15:
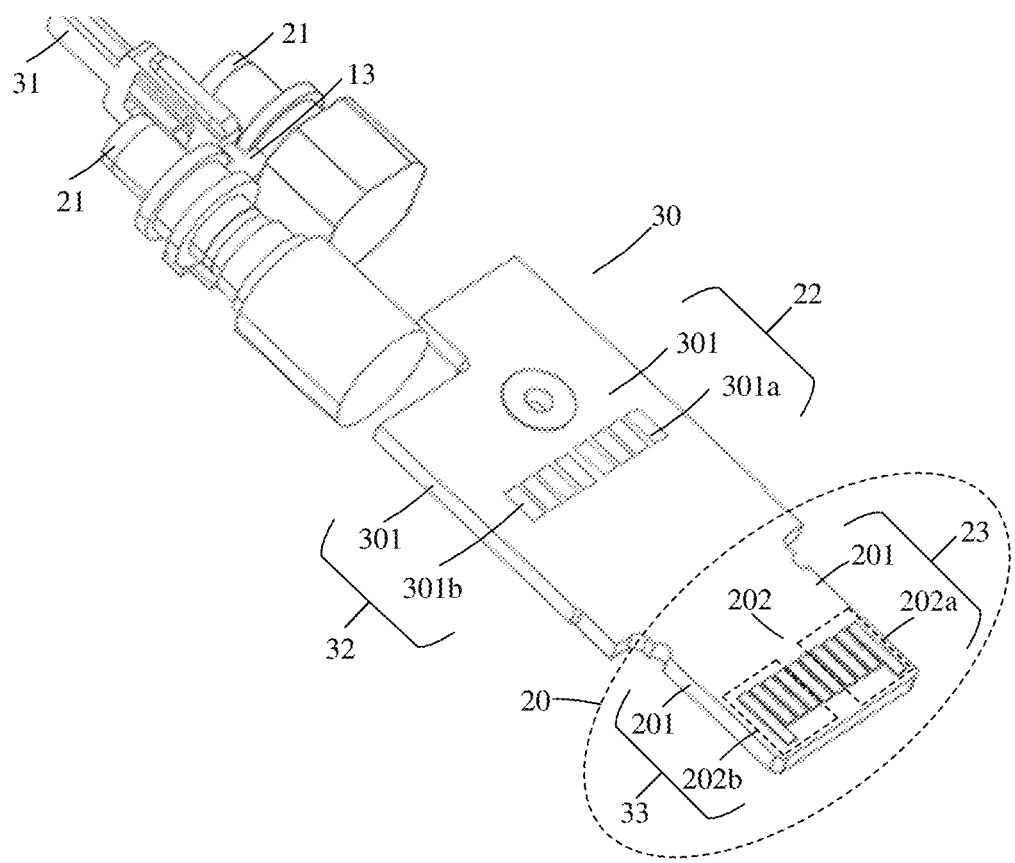
FIG. 15 is a schematic diagram of a structure obtained after an optical component and a power supply component of a composite module are integrated according to this application.

The power supply line 32 and the optical-to-electrical conversion component 22 are integrated, and the second optical connector 23 and the second electrical connector 33 are also integrated. As shown in FIG. 15, the power supply line 32 and the optical-to-electrical conversion component 22 are integrated, and the second optical connector 23 and the second electrical connector 33 are also integrated.

The power supply line 32 and the optical-to-electrical conversion component 22 are integrated, and the position relationship between the second optical connector 23 and the second electrical connector 33 is not specifically limited in this embodiment. The following describes the position relationship between the second optical connector 23 and the second electrical connector 33 in detail.

The position relationship between the optical-to-electrical conversion component 22 and the power supply line 32 is described above. The following describes in detail the position relationship between the second optical connector 23 of the optical component 2 and the second electrical connector 33 of the power supply component 3, and a specific implementation structure of the second electrical connector 33.

Figure 16:
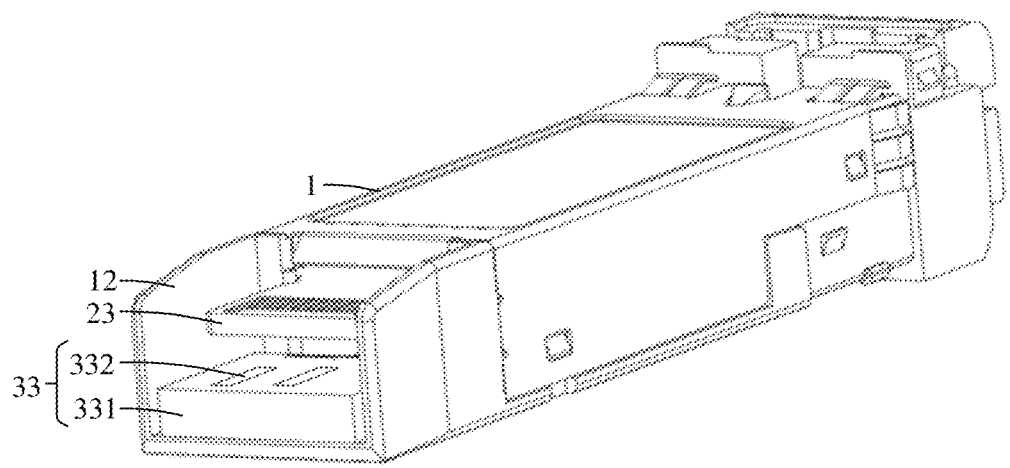
FIG. 16 is a schematic diagram of a structure of a second electrical connector of a composite module according to this application.

In terms of a position relationship, as shown in FIG. 16, the second electrical connector 33 may be located between the second optical connector 23 and an inner wall of the second socket 12 located at the top.

For example, as shown in FIG. 16, the second optical connector 23 and the second electrical connector 33 are independent of each other and are superimposed in the second socket 12. For example, the second electrical connector 33 may be mounted on an inner wall of the second socket 12 located at the top, and the second optical connector 23 is located in the second socket 12.

In an example, the second electrical connector 33 may include a second electrical connector mounting portion 331 and a second electrical connector conductive portion 332. The second electrical connector mounting portion 331 is fixed to the inner wall of the second socket 12 located at the top, the second electrical connector conductive portion 332 is fixed to the second electrical connector mounting portion 331, and the second electrical connector conductive portion 332 is electrically connected to the power supply line 32.

The second electrical connector mounting portion 331 may be made of a plastic part or the like, and the second electrical connector conductive portion 332 may be made of metal or the like.

For example, the second electrical connector mounting portion 331 is of a platy structure, and is mounted on the inner wall of the second socket 12 located at the top. For example, the second electrical connector mounting portion may be fixed to the inner wall of the second socket 12 located at the top through clamping. For another example, the second electrical connector mounting portion may be fixed to the inner wall of the second socket 12 located at the top through gluing.

The second electrical connector mounting portion 331 is used as a carrier of the second electrical connector conductive portion 332, the second electrical connector conductive portion 332 may be fixed to the second electrical connector mounting portion 331, and the second electrical connector conductive portion 332 is further electrically connected to the power supply line 32. There are a plurality of fixing positions of the second electrical connector conductive portion 332 on the second electrical connector mounting portion 331.

For example, one fixed position may be that, as shown in FIG. 16, the second electrical connector conductive portion 332 is a metal sheet; and the second electrical connector conductive portion 332 is fixed to an outer surface of the second electrical connector mounting portion 331, and the outer surface of the second electrical connector mounting portion 331 is a surface parallel to the insertion and removal direction of the composite module.

For example, as shown in FIG. 16, the second electrical connector conductive portion 332 may be attached to an outer surface of the second electrical connector mounting portion 331 facing the second optical connector 23. For another example, the second electrical connector conductive portion 332 may alternatively be attached to an outer surface of a side wall of the second electrical connector mounting portion 331. For another example, when the outer surface of the side wall of the second electrical connector mounting portion 331 is fixed to the inner surface of the side wall of the second socket 12, the second electrical connector conductive portion 332 may alternatively be attached to an outer surface of the second electrical connector mounting portion 331 opposite to the second electrical connector 33.

Figure 17:
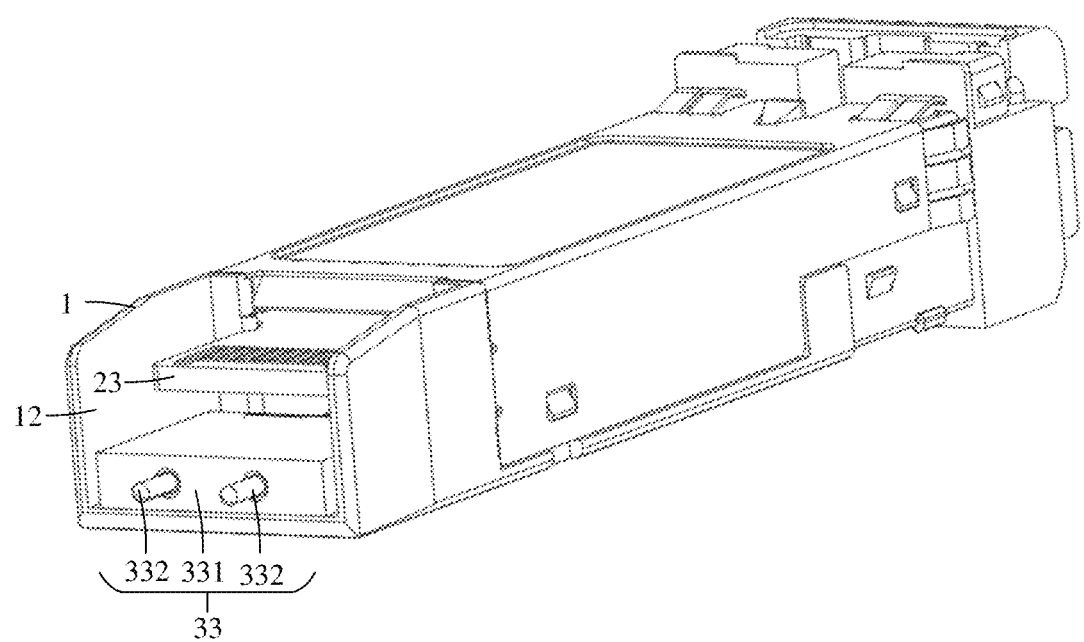
FIG. 17 is a schematic diagram of a structure of a second electrical connector of a composite module according to this application.

For another example, as shown in FIG. 17, the second electrical connector conductive portion 332 is a metal rod; and the second electrical connector conductive portion 332 is fixed inside the second electrical connector mounting portion 331, and extends out of an end face of the second electrical connector mounting portion 331 away from the power supply line 32.

For example, as shown in FIG. 17 and FIG. 13, the second electrical connector conductive portion 332 penetrates the inside of the second electrical connector mounting portion 331, one end of the second electrical connector conductive portion extends out of an end face of the second electrical connector mounting portion 331 close to the power supply line 32 and is electrically connected to the power supply line 32, and the other end of the second electrical connector conductive portion extends out of an end face of the second electrical connector mounting portion 331 away from the power supply line 32 and is electrically connected to the inserted device.

In an example, to make the electrical connection between the second electrical connector conductive portion 332 and the inserted device relatively stable, correspondingly, the second electrical connector conductive portion 332 of the metal rod may be a spring pin, and can be retracted in the insertion and removal direction of the composite module.

Figure 18:
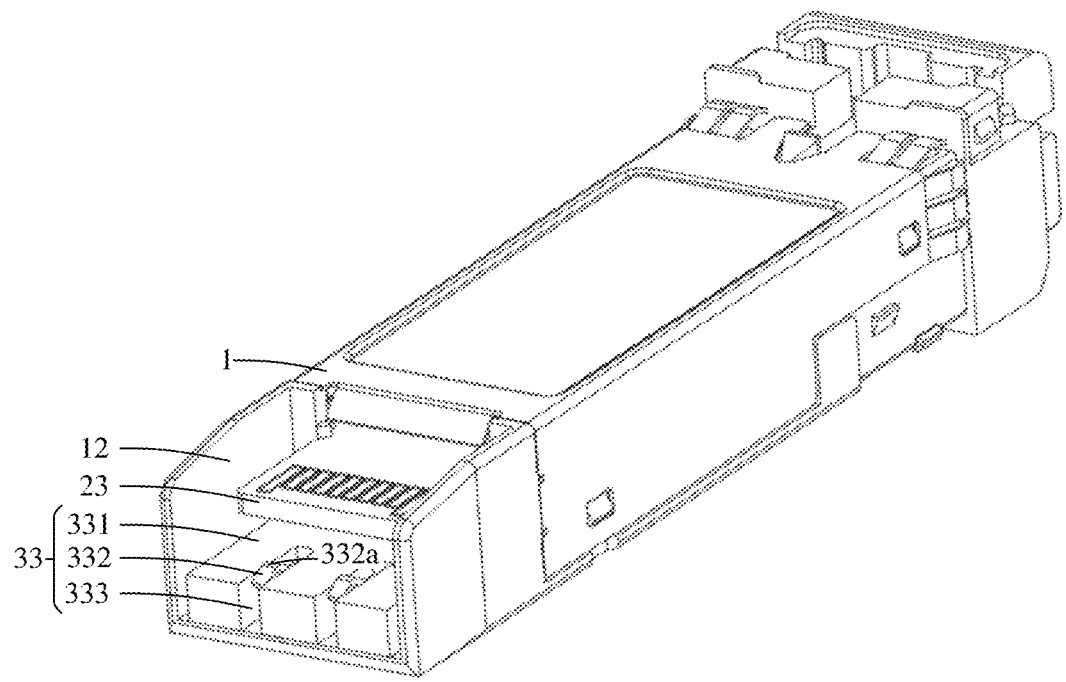
FIG. 18 is a schematic diagram of a structure of a second electrical connector of a composite module according to this application.

For another example, as shown in FIG. 18, the second electrical connector conductive portion 332 is a strip metal spring plate; the second electrical connector mounting portion 331 is provided with a mounting groove 333, the mounting groove 333 is provided with a groove opening on an outer surface of the second electrical connector mounting portion 331, and the outer surface of the second electrical connector mounting portion 331 is a surface parallel to the insertion and removal direction of the composite module; and an end portion of the second electrical connector conductive portion 332 is fixed to a groove wall of the mounting groove 333, and a contact portion 332a of the second electrical connector conductive portion 332 for electrical connection to the inserted device extends out of the groove opening.

The surface parallel to the insertion and removal direction of the composite module may be the outer surface of the second electrical connector mounting portion 331 facing the second optical connector 23, the outer surface of the side wall of the second electrical connector mounting portion 331, the outer surface of the second electrical connector mounting portion 331 opposite to the second optical connector 23, or the like.

For example, the second electrical connector mounting portion 331 is provided with a mounting groove 333. As shown in FIG. 18, the mounting groove 333 is provided with a groove opening on an outer surface facing the second optical connector 23. One end of the second electrical connector conductive portion 332 of the strip metal spring plate may be fixed to a groove wall of the mounting groove 333, and the other end of the second electrical connector conductive portion may be suspended in the mounting groove 333. As shown in FIG. 18, a contact portion 332a of the second electrical connector conductive portion 332 extends out of the groove opening, where the contact portion 332a is a part of the second electrical connector conductive portion 332 and is configured to electrically connect to the inserted device. For example, the contact portion 332a may be a bent portion close to an end portion of the second electrical connector conductive portion 332 or the contact portion 332a may be an end portion of the second electrical connector conductive portion 332. The contact portion 332a extends out of the groove opening of the mounting groove 333, so that when the composite module is inserted into a device, the contact portion 332a may be in contact with a conductive portion in the inserted device to implement an electrical connection.

The foregoing is a case in which the second optical connector 23 and the second electrical connector 33 are independent of each other and are superimposed in the second socket 12. The second optical connector 23 and the second electrical connector 33 may alternatively be integrated together.

Figure 19:
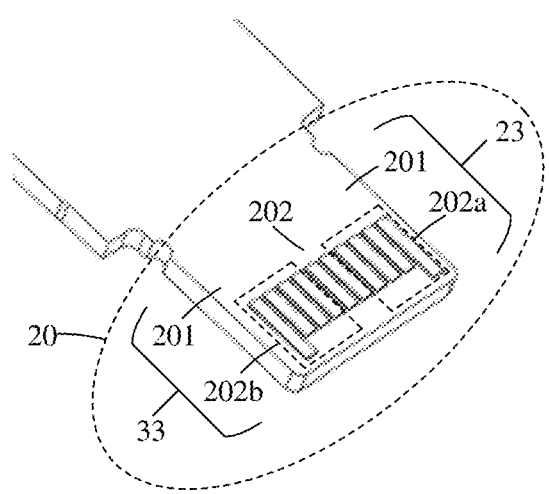
FIG. 19 is a schematic partial view of a structure obtained after a second electrical connector and a second optical connector of a composite module are integrated according to this application.

For example, as shown in FIG. 19, the second electrical connector 33 and the second optical connector 23 are integrated to obtain an optical/electrical composite connector 20. The optical/electrical composite connector 20 includes an optical/electrical composite connector carrier 201 and an edge connector 202, where the edge connector 202 is fixed to a surface of the optical/electrical composite carrier 201, and the surface of the optical/electrical composite carrier 201 is a surface parallel to the insertion and removal direction of the composite module. A first-part metal sheet 202a in the edge connector 202 is electrically connected to the optical-to-electrical conversion component 22 to form the second optical connector 23, and a second-part metal sheet 202b in the edge connector 202 is electrically connected to the power supply line 32 to form the second electrical connector 33.

The edge connector is formed by a plurality of conductive contacts, and is laid on two opposite surfaces of the carrier.

In an example, as shown in FIG. 19, the second electrical connector 33 and the second optical connector 23 are integrated together to obtain an optical/electrical composite connector 20. The optical/electrical composite connector 20 includes an optical/electrical composite carrier 201 and an edge connector 202. The optical/electrical composite carrier 201 is of a platy structure, for example, may be a part of the circuit board close to an end portion. The edge connector 202 may be located on a surface of the optical/electrical composite carrier 201, for example, may be located on two opposite surfaces of the optical/electrical composite carrier 201. A part of metal sheets in the edge connector 202 may be electrically connected to the optical-to-electrical conversion component 22, to form the second optical connector 23, and the other part of the metal sheets in the edge connector 202 may be electrically connected to the power supply line 32, to form the second electrical connector 33. For example, as shown in FIG. 19, a first-part metal sheet 202a in the edge connector 202 is electrically connected to the optical-to-electrical conversion component 22 to form the second optical connector 23, and a second-part metal sheet 202b in the edge connector 202 is electrically connected to the power supply line 32 to form the second electrical connector 33.

In this way, the second optical connector 23 and the second electrical connector 33 are integrated together, so that mounting space of the composite module can be reduced, and miniaturization development of the composite module is facilitated.

Based on the foregoing description, the composite module not only includes an optical component configured to implement conversion between an optical signal and an electrical signal, but also includes a power supply component configured to implement poe power supply. In this way, only an interface configured to insert the composite module may be provided on a panel of a device into which the composite module is inserted, for example, a switch or an ap, and no additional interface configured to implement poe power supply needs to be provided, thereby reducing a panel size of the device.

As described above, the composite module includes the power supply component 3 for implementing poe power supply. During application, the composite module may be configured to determine, when detecting that an inserted optical communication device is a powered device, a power consumption level of the optical communication device and transmit electric energy to the optical communication device based on the power consumption level of the optical communication device.

The poe power supply includes a power sourcing equipment (PSE) and a powered device (PD). The power sourcing equipment may be a PoE switch or the like, and the powered device may be a PoE network camera, an AP, or the like.

For example, in a scenario, the composite module is inserted into an interface of the switch, the composite module is inserted into an interface of the ap, and the composite module on the switch is connected to the composite module on the ap through a composite cable. The switch is the power sourcing equipment, and the ap is the powered device. The switch outputs a very small voltage to the ap through a port. After detecting that the ap is the powered device and supports poe power supply, a processor of the composite module inserted into the switch may feed back that the ap is the powered device to the inserted switch, and then the switch increases the voltage transmitted to the ap, so that the processor of the composite module inserted into the switch detects a power consumption level of the ap, and then the processor of the composite module inserted into the switch determines, based on a pre-stored correspondence between a power consumption level and a supply voltage, a supply voltage corresponding to the power consumption level of the ap, and feeds back the supply voltage required by the ap to the inserted switch, so that the switch stably transmits electric energy to the ap based on the supply voltage.

In an example, the power supply component 3 of the composite module may not only be configured to transmit electric energy, but also be configured to transmit some data signals. The data signals may include a signal used to adjust optical power of the optical component and a signal indicating that the composite module is abnormal.

For example, a transmitting end of the optical component 2 may send an optical signal to the ap, and the ap may send a feedback signal to the optical component 2, where the feedback signal carries a power value of the received optical signal. The feedback signal sent by the ap to the optical component 2 may be transmitted to a processor of the power supply component 3 through the copper wire in the composite cable and the power supply line 32 in the power supply component 3, so that the processor may adjust, based on power of the sent optical signal and power of the optical signal in the feedback signal, a power value of a next optical signal sent by the optical component 2 to the ap, to send an optical signal with appropriate power to the ap.

For example, if the switch sends an optical signal to the ap, an optical module inserted into the panel of the switch is the transmitting end, and an optical module inserted into the panel of the ap is the receiving end. The optical module at the transmitting end sends an optical signal to the optical module at the receiving end through an optical fiber channel. When receiving the optical signal sent by the optical module at the transmitting end, the optical module at the receiving end generates a feedback signal based on the optical signal, and modulates the feedback signal to the power supply component. The power supply component sends the feedback signal to the copper wire of the composite cable through the first electrical connector.

The feedback signal is transmitted to the optical module at the transmitting end through the copper wire, and is transmitted to the power supply component of the optical module at the transmitting end through a first electrical connector of the optical module at the transmitting end. The power supply component of the optical module at the transmitting end sends the feedback signal to the processor, and the processor obtains the feedback signal by parsing. Then, the processor of the optical module at the transmitting end performs equalization adjustment on a parameter of the optical component based on the received feedback signal.

For another example, when a fault occurs in the composite module, for example, power of the sent optical signal is too low, or optical-to-electrical conversion cannot be performed, the power supply component 3 may send an abnormal signal to the inserted device, so that a skilled person can learn, through the device, that the fault occurs in the composite module and the composite module needs to be replaced.

It can be learned that the composite module includes a power supply component for implementing poe. The power supply component can not only transmit electric energy, but also transmit some data signals. The composite module further has a poe management process.

In this embodiment of this application, the composite module not only includes an optical component for implementing conversion between an optical signal and an electrical signal, but also includes a power supply component for implementing poe power supply. A second optical connector of the optical component and a second electrical connector of the power supply component are located in a same socket of the housing, that is, a second socket of the housing. In this way, as an inserted device, an optical port configured to insert an optical module and an electrical port configured to insert a power connector of the inserted device are also located in a same port. For example, only ports configured to insert the composite module need to be provided on panels of a switch and an ap, thereby reducing sizes of the panels of the switch and the ap, and facilitating miniaturization development of the switch and the ap.

This embodiment further provides a manufacturing method for a composite module, where the composite module is the foregoing composite module, and the method may include the following steps.

First, the first optical connector 21 may be connected to one end of the optical-to-electrical conversion component 22, and the second optical connector 23 may be connected to the other end of the optical-to-electrical conversion component 22, to obtain the optical component 2.

For example, as shown in FIG. 4, the optical-to-electrical conversion component 22 includes a laser and a circuit board, another component is further mounted on the circuit board, and the laser is electrically connected to the circuit board. The first optical connector 21 is an end portion of the laser. For example, there are two first optical connectors 21: One is a transmitting end of the transmit laser, and the other is a receiving end of the receive laser. The second optical connector 23 is an end portion of the circuit board provided with an edge connector. In an electrical connection relationship, the first optical connector 21 is electrically connected to the optical-to-electrical conversion component 22, and the second optical connector 23 is electrically connected to the optical-to-electrical conversion component 22.

Then, the first electrical connector 31 is connected to one end of the power supply line 32, and the second electrical connector 33 is connected to the other end of the power supply line 32, to obtain the power supply component 3.

For example, as shown in FIG. 5, the power supply line 32 may include a cable and a bearing board bearing the cable, where the cable is laid on the bearing board. The first electrical connector 31 includes a first electrical connector mounting portion 311, a first electrical connector connecting portion 312, and a first electrical connector conductive portion 313. The second electrical connector 33 includes a second electrical connector mounting portion 331 and a second electrical connector conductive portion 332. The first electrical connector mounting portion 311 is fixed to the first electrical connector connecting portion 312, an end portion of the first electrical connector mounting portion 311 away from the first electrical connector connecting portion 312 is fixed to the beam 13, and the bearing board of the power supply line 32 is also fixed to the beam 13. One end of the bearing board away from the beam 13 is fixedly connected to the second electrical connector mounting portion 331. In an electrical connection relationship, two ends of the cable of the power supply line 32 are electrically connected to the first electrical connector conductive portion 313 and the second electrical connector conductive portion 332 respectively. One end of the first electrical connector conductive portion 313 away from the cable extends out of the first electrical connector mounting portion 311, and is fixed to the first electrical connector connecting portion 312. One end of the second electrical connector conductive portion 332 away from the cable is exposed from the second electrical connector mounting portion 331, so that the composite module can be electrically connected to an inserted device.

Then, the obtained optical component 2 and the obtained power supply component 3 are mounted in the housing 1, the first optical connector 21 is located in the first socket 11 of the housing 1, the first electrical connector 31 is exposed from the housing 1, and both the second optical connector 23 and the second electrical connector 33 are located in the second socket 12 of the housing 1.

For example, after the optical component 2 and the power supply component 3 are obtained, the optical component 2 and the power supply component 3 may be mounted in the housing 1. For example, the first electrical connector 31 of the power supply component 3 may be located between the two first optical connectors 21 of the optical component 2, both the first electrical connector 31 and the first optical connector 21 are located in the first socket 11, and both the second electrical connector 33 of the power supply component 3 and the second optical connector 23 of the optical component 2 are located in the second socket 12.

For example, a possible manufacturing manner of the composite module may be that the composite module may be manufactured based on an optical module. For example, a housing of the optical module is opened, and a cable or a flexible circuit board may be laid on an inner surface of an inner wall of the housing close to an upper cover or close to a base, or a flat cable or the like may be directly arranged on a circuit board of the optical module, to serve as a power supply line of the power supply component. Then, a first electrical connector is mounted on an outer surface of a beam of the optical module, and a first electrical connector conductive portion of the first electrical connector is electrically connected to the power supply line. Then, a second electrical connector is mounted at a position of the housing of the optical module close to a second optical connector. The second electrical connector may be mounted on an inner surface of the housing close to the second optical connector, or may be integrated onto the second optical connector. For example, an edge connector of the second optical connector is usually provided with a reserved metal sheet, and the reserved metal sheet may be used as a second optical connector conductive portion of the second optical connector.

A specific manufacturing and mounting process of the composite module is not specifically limited in this embodiment, provided that both the optical-to-electrical conversion component 22 of the optical component 2 and the power supply line 32 of the power supply component 3 can be located in the housing 1, the first optical connector 21 of the optical component 2 and the first electrical connector 31 of the power supply component 3 can be located in the first socket 11 of the housing 1, and the second optical connector 23 of the optical component 2 and the second electrical connector 33 of the power supply component 3 can be located in the second socket 12.

In an example of this application, the composite module not only includes an optical component for implementing conversion between an optical signal and an electrical signal, but also includes a power supply component for implementing poe power supply. A second optical connector of the optical component and a second electrical connector of the power supply component are located in a same socket of the housing, that is, a second socket of the housing. In this way, as an inserted device, an optical port configured to insert an optical module and an electrical port configured to insert a power connector of the inserted device are also located in a same port. For example, only ports configured to insert the composite module need to be provided on panels of a switch and an ap, thereby reducing sizes of the panels of the switch and the ap, and facilitating miniaturization development of the switch and the ap.

The foregoing descriptions are merely embodiments of this application, but are not intended to limit this application. Any modification, equivalent replacement, or improvement made without departing from the spirit and principle of this application should fall within the protection scope of this application.

What is claimed is:

1. A composite module, comprising:
   a housing, wherein a first end of the housing has a first socket, and a second end of the housing has a second socket;
   an optical component, wherein the optical component comprises a first optical connector, an optical-to-electrical conversion component, and a second optical connector, wherein one end of the optical-to-electrical conversion component is connected to the first optical connector, and the other end of the optical-to-electrical conversion component is connected to the second optical connector; and
   a power supply component, wherein the power supply component comprises a first electrical connector, a power supply line, and a second electrical connector, wherein one end of the power supply line is connected to the first electrical connector, and the other end of the power supply line is connected to the second electrical connector,
   wherein both the optical-to-electrical conversion component and the power supply line are located in the housing, the first optical connector is located in the first socket, the first electrical connector is exposed from the housing, and both the second optical connector and the second electrical connector are located in the second socket.

2. The composite module according to claim 1, wherein the first electrical connector is located in the first socket.

3. The composite module according to claim 1, wherein the composite module is a single-fiber bidirectional composite module, there is one first optical connector, and the first electrical connector is located around the first optical connector.

4. The composite module according to claim 1, wherein the composite module is a two-fiber bidirectional composite module, there are two first optical connectors, and the first electrical connector is located between the two first optical connectors.

5. The composite module according to claim 1, wherein the first electrical connector comprises a first electrical connector mounting portion, a first electrical connector connecting portion, and a first electrical connector conductive portion;
   wherein one end of the first electrical connector mounting portion is fixed to the first electrical connector connecting portion, and the other end of the first electrical connector mounting portion is fixed to the housing; and
   wherein the first electrical connector conductive portion is of a strip structure, one end of the first electrical connector conductive portion is electrically connected to the power supply line, the other end of the first electrical connector conductive portion extends out of the first electrical connector mounting portion, and the first electrical connector conductive portion is fixed to the first electrical connector connecting portion.

6. The composite module according to claim 5, wherein a part of the first electrical connector conductive portion extending out of the first electrical connector mounting portion is fixed to an outer surface of a side wall of the first electrical connector connecting portion.

7. The composite module according to claim 5, wherein a part of the first electrical connector conductive portion extending out of the first electrical connector mounting portion is fixed inside the first electrical connector connecting portion and extends out of an end face of the first electrical connector connecting portion away from the first electrical connector mounting portion.

8. The composite module according to claim 5, wherein a part of the first electrical connector conductive portion extending out of the first electrical connector mounting portion is fixed to a surface of an inner wall of a hollow structure of the first electrical connector connecting portion; and
   wherein the hollow structure is a structure that is provided inside the first electrical connector connecting portion and has an opening on an end face of the first electrical connector connecting portion away from the first electrical connector mounting portion.

9. The composite module according to claim 5, wherein a first side wall and a second side wall of the first electrical connector mounting portion that are opposite each other are provided with a guide block, and a first inner wall and a second inner wall of the housing that are opposite each other are provided with a guide groove;
   wherein the guide block on the first side wall is located in the guide groove on the first inner wall, and the guide block on the second side wall is located in the guide groove on the second inner wall; and wherein the first inner wall is an inner wall of the housing located at the bottom, and the second inner wall is an inner wall of the housing located at the top.

10. The composite module according to claim 9, wherein a width of the guide block gradually decreases from a first end portion of the guide block close to the power supply line to a second end portion of the guide block away from the power supply line; and wherein a groove width of the guide groove gradually decreases from a first groove end of the guide groove close to the second socket to a second groove end of the guide groove away from the second socket.

11. The composite module according to claim 1, wherein the optical-to-electrical conversion component and the power supply line are superimposed.

12. The composite module according to claim 1, wherein the power supply line and the optical-to-electrical conversion component are integrated.

13. The composite module according to claim 1, wherein the second electrical connector is located between the second optical connector and an inner wall of the second socket located at the top.

14. The composite module according to claim 13, wherein the second electrical connector comprises a second electrical connector mounting portion and a second electrical connector conductive portion; and wherein the second electrical connector mounting portion is fixed to the inner wall of the second socket located at the top, the second electrical connector conductive portion is fixed to the second electrical connector mounting portion, and the second electrical connector conductive portion is electrically connected to the power supply line.

15. The composite module according to claim 14, wherein the second electrical connector conductive portion is a metal sheet; and wherein the second electrical connector conductive portion is fixed to an outer surface of the second electrical connector mounting portion, and the outer surface of the second electrical connector mounting portion is a surface parallel to an insertion and removal direction of the composite module.

16. The composite module according to claim 14, wherein the second electrical connector conductive portion is a metal rod; and wherein the second electrical connector conductive portion is fixed inside the second electrical connector mounting portion, and extends out of an end face of the second electrical connector mounting portion away from the power supply line.

17. The composite module according to claim 14, wherein the second electrical connector conductive portion is a strip metal spring plate;

wherein the second electrical connector mounting portion has a mounting groove, the mounting groove has a groove opening on an outer surface of the second electrical connector mounting portion, and the outer surface of the second electrical connector mounting portion is a surface parallel to an insertion and removal direction of the composite module; and wherein an end portion of the second electrical connector conductive portion is fixed to a groove wall of the mounting groove, and a contact portion of the second electrical connector conductive portion for electrical connection to an inserted device extends out of the groove opening.

18. The composite module according to claim 1, wherein the second electrical connector and the second optical connector are integrated into an optical/electrical composite connector;

wherein the optical/electrical composite connector comprises an optical/electrical composite carrier and an edge connector, wherein the edge connector is fixed to a surface of the optical/electrical composite carrier, and the surface of the optical/electrical composite carrier is a surface parallel to an insertion and removal direction of the composite module; and wherein a first-part metal sheet in the edge connector is electrically connected to the optical-to-electrical conversion component to form the second optical connector, and a second-part metal sheet in the edge connector is electrically connected to the power supply line to form the second electrical connector.

19. The composite module according to claim 1, wherein the power supply component is configured to transmit electric energy and a data signal, and the data signal comprises a signal to adjust optical power of the optical component and a signal indicating that the optical component is abnormal.

20. The composite module according to claim 1, wherein the composite module is configured to:

determine, based on detecting that an inserted optical communication device is a powered device, a power consumption level of the optical communication device; and transmit electric energy to the optical communication device based on the power consumption level of the optical communication device.

21. A manufacturing method for a composite module, comprising:

forming an optical component by connecting a first optical connector to one end of an optical-to-electrical conversion component, and connecting a second optical connector to the other end of the optical-to-electrical conversion component;

forming a power supply component by connecting a first electrical connector to one end of a power supply line, and connecting a second electrical connector to the other end of the power supply line; and mounting the optical component and the power supply component in a housing, wherein the first optical connector is located in a first socket of the housing, the first electrical connector is exposed from the housing, and both the second optical connector and the second electrical connector are located in a second socket of the housing;

wherein the composite module comprises the housing, the optical component, and the power supply component; and wherein a first end of the housing has the first socket, and a second end of the housing has the second socket.

* * * * *